United States Patent
Mizuno

(10) Patent No.: US 9,860,405 B2
(45) Date of Patent: Jan. 2, 2018

(54) PRINTING APPARATUS, PRINTING APPARATUS CONTROL METHOD, AND A STORAGE MEDIUM

(71) Applicant: CANON KABUSHIKI KAISHA, Tokyo (JP)

(72) Inventor: Yoshitake Mizuno, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/019,219

(22) Filed: Feb. 9, 2016

(65) Prior Publication Data

US 2016/0241730 A1    Aug. 18, 2016

(30) Foreign Application Priority Data

Feb. 12, 2015    (JP) ................................. 2015-025843

(51) Int. Cl.
  *H04N 1/46*    (2006.01)
  *H04N 1/00*    (2006.01)

(52) U.S. Cl.
  CPC ..... *H04N 1/00702* (2013.01); *H04N 1/00572* (2013.01); *H04N 1/00721* (2013.01); *H04N 1/00724* (2013.01); *H04N 1/00795* (2013.01)

(58) Field of Classification Search
  None
  See application file for complete search history.

(56) References Cited

U.S. PATENT DOCUMENTS

| | | | | |
|---|---|---|---|---|
| 6,532,026 B2 * | 3/2003 | Takahashi | .............. | B41J 19/145 347/19 |
| 7,079,709 B2 * | 7/2006 | Aas | ......................... | G06T 3/403 358/1.2 |
| 7,782,492 B2 * | 8/2010 | Seko | .................... | H04N 1/6058 358/2.1 |
| 8,437,577 B2 * | 5/2013 | Ferguson | .............. | G06T 7/0002 382/294 |
| 8,441,697 B2 * | 5/2013 | Fletcher | ............. | H04N 1/00002 348/46 |
| 8,767,250 B2 * | 7/2014 | Kaima | ................. | G06K 15/128 347/225 |

(Continued)

FOREIGN PATENT DOCUMENTS

JP    2003-173109 A    6/2003

*Primary Examiner* — Dung Tran
(74) *Attorney, Agent, or Firm* — Canon U.S.A., Inc. IP Division

(57) ABSTRACT

The time for detecting an object position for measuring a print position displacement is shortened. A printing apparatus control method includes printing, by a printing unit, an image including an object on a sheet; reading, by a reading unit, the image on the sheet on which the image including the object is printed; generating first image data according to the reading of the image by the reading unit; determining an area to detect a position of the object from second image data generated based on the generated first image data having resolution lower than that of the second image data; detecting the position of the object from the determined area; obtaining a print position based on the position of the object detected by the detecting unit; and controlling, based on the obtained print position, the printing unit to print the image on the sheet.

17 Claims, 20 Drawing Sheets

(56) References Cited

U.S. PATENT DOCUMENTS

| | | | |
|---|---|---|---|
| 9,277,063 B2* | 3/2016 | Kido | H04N 1/00013 |
| 2005/0264835 A1* | 12/2005 | Okita | H04N 1/4072 |
| | | | 358/1.9 |
| 2007/0041028 A1* | 2/2007 | Seko | H04N 1/6058 |
| | | | 358/1.9 |
| 2014/0233071 A1* | 8/2014 | Kido | H04N 1/00013 |
| | | | 358/3.26 |
| 2015/0116734 A1* | 4/2015 | Howard | B41J 2/2135 |
| | | | 358/1.4 |

* cited by examiner

FIG. 4

| | 411 | 412 | 413 | 414 | 415 | 416 | 417 | 420 | 421 |
|---|---|---|---|---|---|---|---|---|---|
| SHEET NAME | SUB SCANNING DIRECTION SHEET LENGTH (mm) | MAIN SCANNING DIRECTION SHEET LENGTH (mm) | GRAMMAGE (g/m²) | SURFACE NATURE | COLOR | PREPRINTED SHEET | | PRINT POSITION DISPLACEMENT AMOUNT (FRONT SIDE) | PRINT POSITION DISPLACEMENT AMOUNT (BACK SIDE) |
| ABC COMPANY RECYCLED PAPER 1 | 210 | 297 | 75 | PLAIN PAPER | WHITE | No | | READ POSITION: 0.3 mm<br>SIDE POSITION: -0.1 mm<br>MAIN SCANNING SCALING RATE: +0.02%<br>SUB SCANNING SCALING RATE: +0.01% | READ POSITION: 0.2 mm<br>SIDE POSITION: 0.1 mm<br>MAIN SCANNING SCALING RATE: 0.02%<br>SUB SCANNING SCALING RATE: -0.03% |
| ABC COMPANY RECYCLED PAPER 2 | 297 | 420 | 75 | PLAIN PAPER | WHITE | No | | READ POSITION: 0.0 mm<br>SIDE POSITION: -0.0 mm<br>MAIN SCANNING SCALING RATE: +0.00%<br>SUB SCANNING SCALING RATE: +0.00% | READ POSITION: 0.0 mm<br>SIDE POSITION: -0.0 mm<br>MAIN SCANNING SCALING RATE: +0.00%<br>SUB SCANNING SCALING RATE: +0.00% |
| DEF COMPANY EMBOSSED PAPER A-1 | 216 | 279 | 150 | EMBOSSED PAPER | WHITE | No | | READ POSITION: 0.5 mm<br>SIDE POSITION: -0.5 mm<br>MAIN SCANNING SCALING RATE: +0.02%<br>SUB SCANNING SCALING RATE: +0.02% | READ POSITION: -0.3 mm<br>SIDE POSITION: 0.5 mm<br>MAIN SCANNING SCALING RATE: +0.01%<br>SUB SCANNING SCALING RATE: -0.03% |
| DEF COMPANY COATED SHEET P-1 | 279 | 432 | 128 | BOTH-SIDE COATED PAPER | WHITE | No | | READ POSITION: 0.4 mm<br>SIDE POSITION: -0.2 mm<br>MAIN SCANNING SCALING RATE: +0.12%<br>SUB SCANNING SCALING RATE: +0.08% | READ POSITION: -0.2 mm<br>SIDE POSITION: 0.6 mm<br>MAIN SCANNING SCALING RATE: -0.02%<br>SUB SCANNING SCALING RATE: -0.01% |
| XYZ COMPANY COLORED PAPER 81 | 210 | 297 | 75 | PLAIN PAPER | ORANGE | No | | READ POSITION: 0.0 mm<br>SIDE POSITION: -0.0 mm<br>MAIN SCANNING SCALING RATE: +0.00%<br>SUB SCANNING SCALING RATE: +0.00% | READ POSITION: 0.0 mm<br>SIDE POSITION: -0.0 mm<br>MAIN SCANNING SCALING RATE: +0.00%<br>SUB SCANNING SCALING RATE: +0.00% |
| XYZ COMPANY COLORED PAPER 82 | 210 | 297 | 75 | PLAIN PAPER | PINK | No | | READ POSITION: 0.0 mm<br>SIDE POSITION: -0.0 mm<br>MAIN SCANNING SCALING RATE: +0.00%<br>SUB SCANNING SCALING RATE: +0.00% | READ POSITION: 0.0 mm<br>SIDE POSITION: -0.0 mm<br>MAIN SCANNING SCALING RATE: +0.00%<br>SUB SCANNING SCALING RATE: +0.00% |
| FGH COMPANY GRAPH PAPER 75 | 210 | 297 | 75 | PLAIN PAPER | WHITE | Yes | | READ POSITION: 0.0 mm<br>SIDE POSITION: -0.0 mm<br>MAIN SCANNING SCALING RATE: +0.00%<br>SUB SCANNING SCALING RATE: +0.00% | READ POSITION: 0.0 mm<br>SIDE POSITION: -0.0 mm<br>MAIN SCANNING SCALING RATE: +0.00%<br>SUB SCANNING SCALING RATE: +0.00% |
| FGH COMPANY PLAIN PAPER 2 | 210 | 297 | 75 | PLAIN PAPER | WHITE | No | | READ POSITION: -0.03 mm<br>SIDE POSITION: -0.07 mm<br>MAIN SCANNING SCALING RATE: -0.06%<br>SUB SCANNING SCALING RATE: -0.01% | READ POSITION: -0.03 mm<br>SIDE POSITION: -0.10 mm<br>MAIN SCANNING SCALING RATE: -0.04%<br>SUB SCANNING SCALING RATE: -0.02% |

FIG. 5A

SHEET MANAGEMENT TABLE EDIT

| SHEET NAME | SUB SCANNING DIRECTION SHEET LENGTH (mm) | MAIN SCANNING DIRECTION SHEET LENGTH (mm) | GRAMMAGE (g/m$^2$) | SURFACE NATURE | COLOR |
|---|---|---|---|---|---|
| ABC COMPANY RECYCLED PAPER 1 | 210 | 297 | 75 | PLAIN PAPER | WHITE |
| ABC COMPANY RECYCLED PAPER 2 | 297 | 420 | 75 | PLAIN PAPER | WHITE |
| DEF COMPANY EMBOSSED PAPER A-1 | 216 | 279 | 150 | EMBOSSED PAPER | WHITE |
| DEF COMPANY COATED PAPER P-1 | 279 | 432 | 128 | BOTH-SIDE COATED PAPER | WHITE |
| XYZ COMPANY COLORED PAPER 81 | 210 | 297 | 75 | PLAIN PAPER | ORANGE |
| XYZ COMPANY COLORED PAPER 82 | 210 | 297 | 75 | PLAIN PAPER | PINK |

500

501 ADD  502 EDIT  DELETE  503 PRINT POSITION ADJUSTMENT

FIG. 5B

SHEET ATTRIBUTE EDIT

| | |
|---:|:---|
| SHEET NAME | XYZ COMPANY COLORED PAPER 81 |
| SUB SCANNING DIRECTION SHEET LENGTH (mm) | 210 |
| MAIN SCANNING DIRECTION SHEET LENGTH (mm) | 297 |
| GRAMMAGE (g/m²) | 75 |
| SURFACE NATURE | PLAIN PAPER ▽ |
| COLOR | WHITE ▽ |
| PREPRINTED SHEET | ☑ |

END EDITING    CANCEL

FIG. 7

| | MEASURED VALUE | DESIRED VALUE | PRINT POSITION DISPLACEMENT AMOUNT |
|---|---|---|---|
| READ POSITION (FRONT SIDE) | $\frac{(c)+(e)}{2}$ | 1 cm | MEASURED VALUE − DESIRED VALUE |
| SIDE POSITION (FRONT SIDE) | $\frac{(f)+(j)}{2}$ | 1 cm | MEASURED VALUE − DESIRED VALUE |
| MAIN SCANNING SCALING RATE (FRONT SIDE) | $\frac{((B)-(d)-(f))+((B)-(h)-(j))}{2}$ | (MAIN SCANNING DIRECTION SHEET LENGTH) − 2 cm | $\frac{(\text{MEASURED VALUE}-\text{DESIRED VALUE})}{\text{DESIRED VALUE}}$ |
| SUB SCANNING SCALING RATE (FRONT SIDE) | $\frac{((A)-(c)-(g))+((A)-(e)-(i))}{2}$ | (SUB SCANNING DIRECTION SHEET LENGTH) − 2 cm | $\frac{(\text{MEASURED VALUE}-\text{DESIRED VALUE})}{\text{DESIRED VALUE}}$ |
| READ POSITION (BACK SIDE) | $\frac{(k)+(m)}{2}$ | 1 cm | MEASURED VALUE − DESIRED VALUE |
| SIDE POSITION (BACK SIDE) | $\frac{(n)+(r)}{2}$ | 1 cm | MEASURED VALUE − DESIRED VALUE |
| MAIN SCANNING SCALING RATE (BACK SIDE) | $\frac{((B)-(l)-(n))+((B)-(p)-(r))}{2}$ | (MAIN SCANNING DIRECTION SHEET LENGTH) − 2 cm | $\frac{(\text{MEASURED VALUE}-\text{DESIRED VALUE})}{\text{DESIRED VALUE}}$ |
| SUB SCANNING SCALING RATE (BACK SIDE) | $\frac{((A)-(k)-(o))+((A)-(m)-(q))}{2}$ | (SUB SCANNING DIRECTION SHEET LENGTH) − 2 cm | $\frac{(\text{MEASURED VALUE}-\text{DESIRED VALUE})}{\text{DESIRED VALUE}}$ |

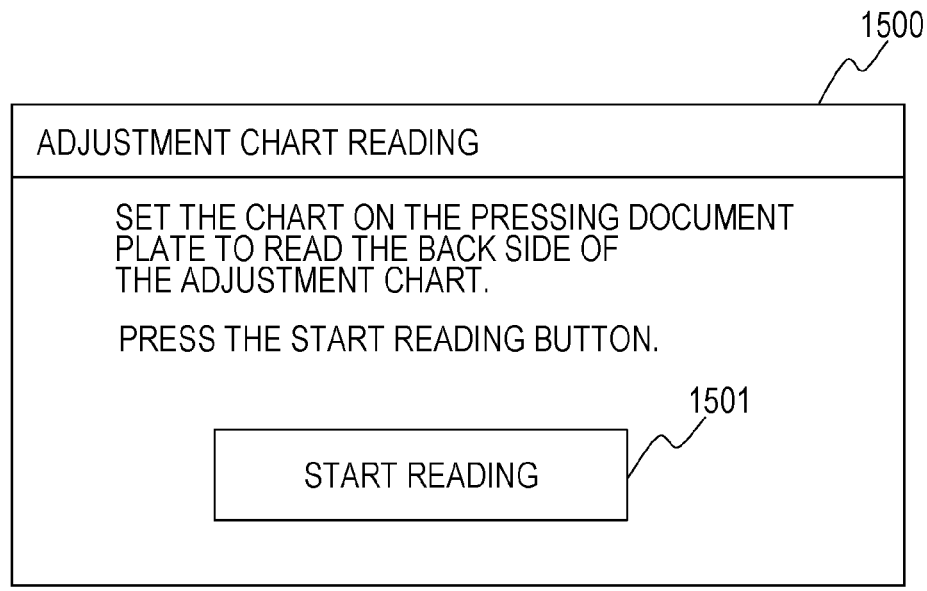
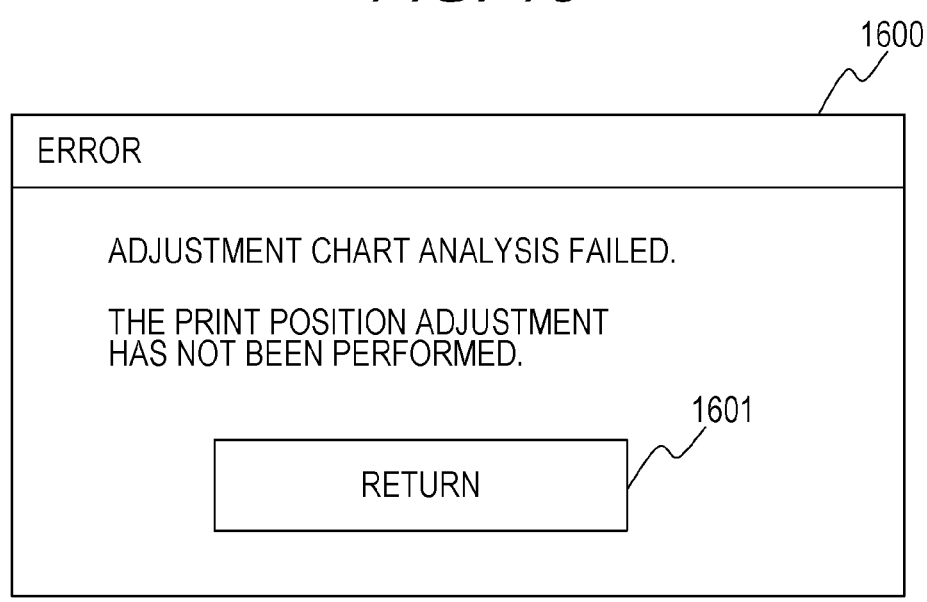

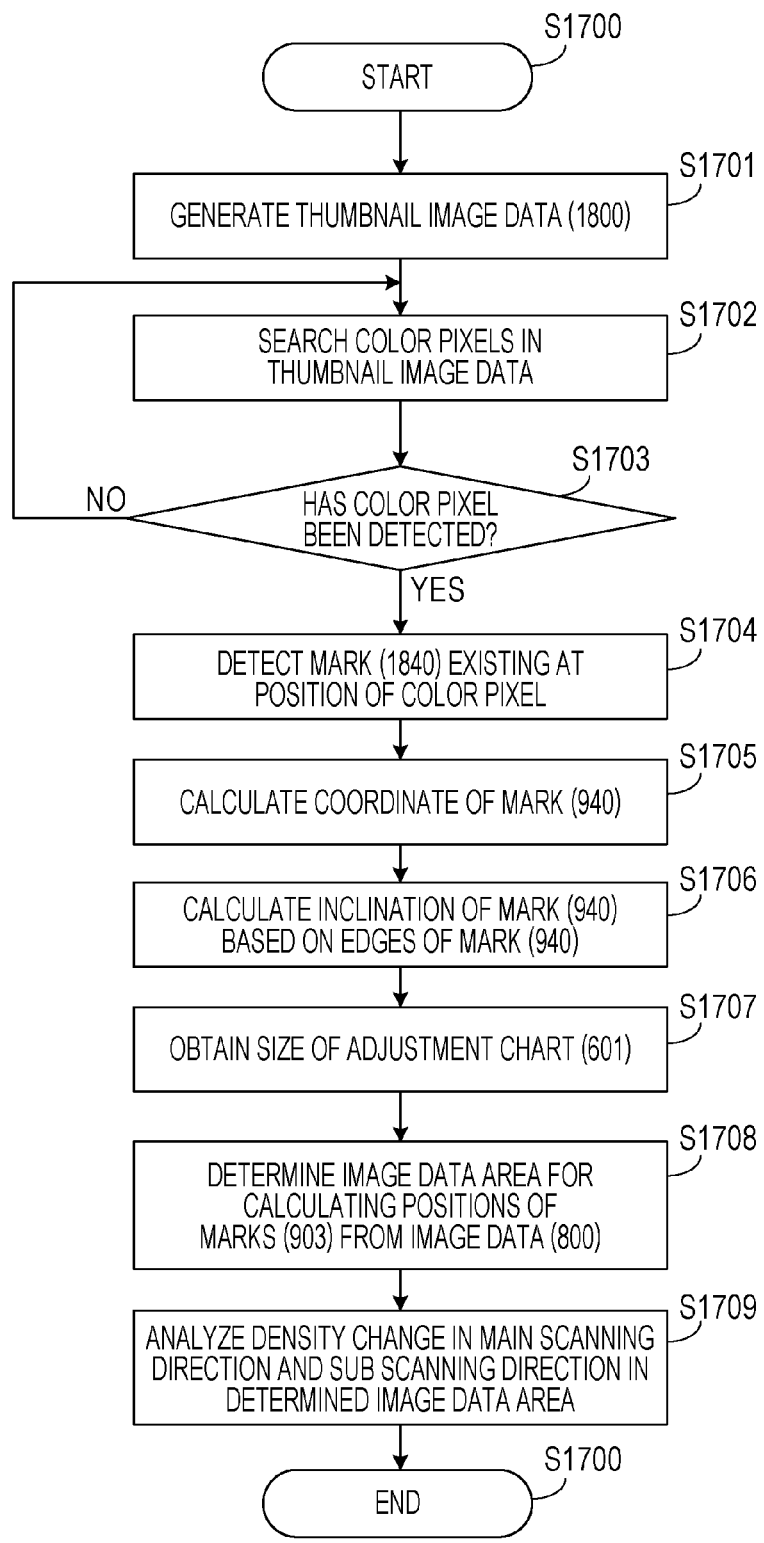

FIG. 19
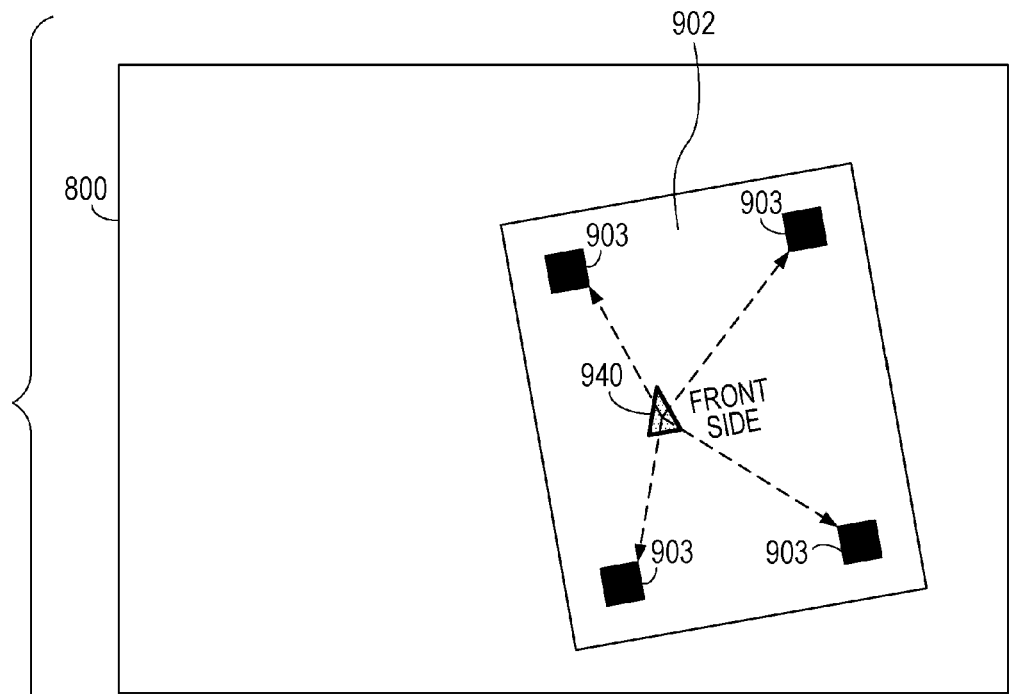
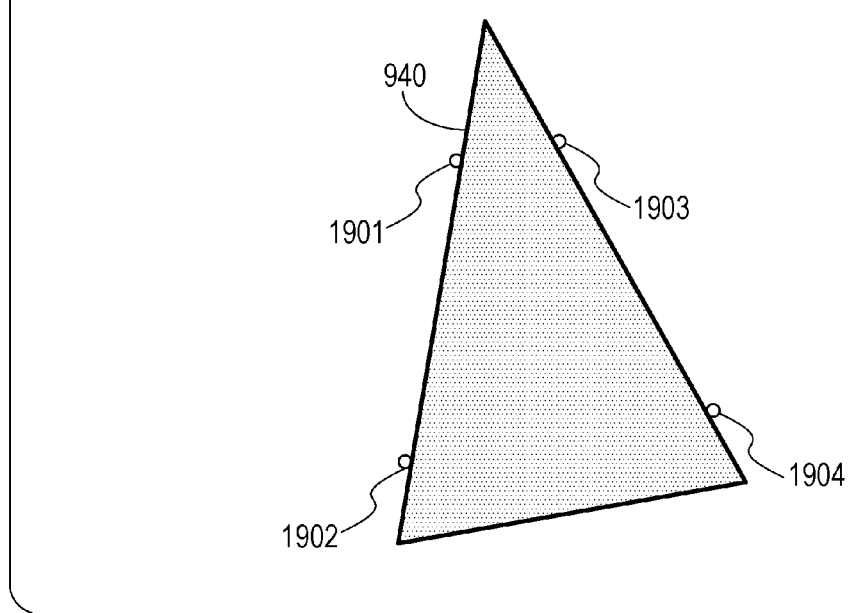

PRINTING APPARATUS, PRINTING APPARATUS CONTROL METHOD, AND A STORAGE MEDIUM

BACKGROUND OF THE INVENTION

Field of the Invention

The present invention relates to a printing apparatus, a printing apparatus control method, and a storage medium.

Description of the Related Art

When images are printed on both sides of a sheet, a printing apparatus firstly forms a toner image on a front side of the sheet and fixes the toner image by heat in a fixing unit. In this case, due to the heat form the fixing unit, the sheet is contracted. Then, this image forming apparatus forms a toner image on a back side of the contracted sheet. This causes a displacement of a print position in the main scanning direction and the sub scanning direction on the front side and back side, respectively, of the sheet.

In a printing apparatus described in Japanese Patent Application Laid-Open No. 2003-173109, on a sheet which has a reference position mark at a predetermined position, four measurement position marks which are different from the reference position are printed at predetermined positions. Then, the printing apparatus reads the image of the sheet (hereinafter, referred to as a chart) including the reference position mark and the four measurement position marks, searches all pixels of the generated image data, and detects the position of the reference position mark and the positions of the four measurement position marks. Next, the printing apparatus obtains coordinate of each of the four measurement position marks based on distances between the position of the detected reference position mark and the respective four measurement position marks, and corrects the print position.

To obtain the displacement of the print position, a scaling rate in the main scanning direction, and a scaling rate in the sub scanning direction properly, the position of the reference position mark and the positions of the four measurement position marks in the image data need to be detected correctly.

In the printing apparatus described in Japanese Patent Application Laid-Open No. 2003-173109, it takes time to process the detection of each position of the four measurement position marks in the image data, since it is needed to search all the pixels in the image data generated by scanning the image of the chart.

SUMMARY OF THE INVENTION

A printing apparatus includes a printing unit configured to print an image including an object on a sheet; a reading unit configured to read the image of the sheet on which the image including the object is printed by the printing unit; a generating unit configured to generate first image data according to the reading of the image including the object by the reading unit; a determining unit configured to determine an area to detect a position of the object from second image data that is generated by the generating unit based on the first image data generated by the generating unit, the first image data having resolution lower than that of the second image data; a detecting unit configured to detect the position of the object from the area determined by the determining unit; an obtaining unit configured to obtain a print position based on the position of the object detected by the detecting unit; and a print controlling unit configured to control the printing unit, based on the print position obtained by the obtaining unit, to print the image on the sheet.

Further features of the present invention will become apparent from the following description of exemplary embodiments (with reference to the attached drawings).

BRIEF DESCRIPTION OF THE DRAWINGS

FIG. 4 is an example of a table according to the present embodiment.

FIGS. 5A and 5B are diagrams for explaining a configuration of a screen according to the present embodiment.

FIG. 7 is an example of a table according to the present embodiment.

FIG. 15 is a diagram for explaining a configuration of a screen according to the first embodiment.

FIG. 16 is a diagram for explaining a configuration of a screen according to the first embodiment.

FIG. 17 is a flowchart for explaining an example of control according to the first embodiment.

FIG. 19 is a diagram for explaining a detection process according to the first embodiment.

DESCRIPTION OF THE EMBODIMENTS

Hereinafter, an embodiment according to the present invention will be described in detail with reference to the attached drawings. Note that the present invention according to the claims is not limited to the following embodiments, and the means for solving the problem of the present invention do not necessarily require all of the combinations of characteristics described in the embodiment.

[First Embodiment]

Figure 1:
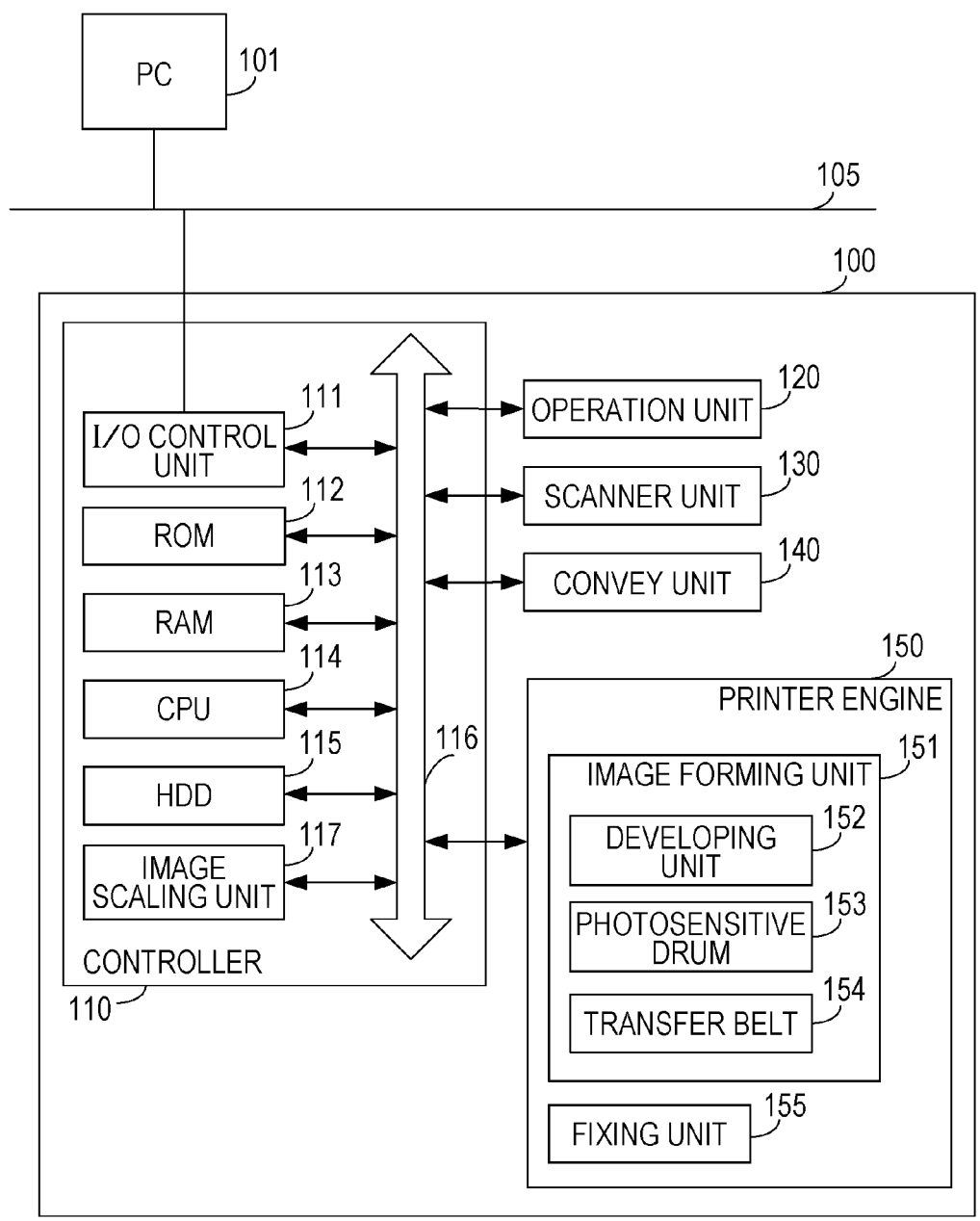
FIG. 1 is a block diagram illustrating a configuration of a printing system according to the present embodiment.

A configuration of a printing system according to a first embodiment of the present invention will be described with reference to FIG. 1.

In the first embodiment, a CPU 114 instructs to read an image of a sheet (referred to as an adjustment chart) including a first object (for example, a measurement mark) to measure a displacement of a print position. Then, the CPU 114 generates first image data and second image data (for example, thumbnail image data) having resolution lower than that of the first image data, according to the reading of the image of the adjustment chart. Next, the CPU 114 detects a position of a second object from the generated second image data. Then, the CPU 114 detects the position of the first object from the first image data based on the detected position of the second object. This configuration shortens the time required for the search process since all the pixels in the image data of the image of the adjustment chart do not have to be searched to detect the position of the object to measure the displacement of the print position.

Detailed explanation will be given below.

The printing system according to the present embodiment includes a printing apparatus 100 and a PC (computer) 101 which is an example of an external device.

The printing apparatus 100 has an image reading function for reading a document and generating image data and a printing function (copying function) for printing an image on a sheet based on the generated image data. The printing apparatus 100 further has a printing function (data printing function) for receiving a print job from an external device such as the PC 101 and for printing letters or an image on a sheet based on the data that is received with a print instruction. Here, printing by the printing function may be either polychrome or monochrome.

A controller (control unit) 110 of the printing apparatus 100 is connected to the PC 101 via a network cable 105. Here, the controller 110 and the PC 101 do not have to be configured to be connected via the network cable 105. The controller 110 and the PC 101 may be configured to be connected via a LAN (Local Area Network) or the like. Further, the controller 110 and the PC 101 may be configured to be connected via a WAN (Wide Area Network) such as the Internet or via a dedicated printer cable. Here, FIG. 1 illustrates a configuration in which the single PC 101 is connected to the printing apparatus 100 via the network cable 105; however, this example does not set any limitation. More than one PCs 101 may be connected to the printing apparatus 100 via the network cable 105.

The PC 101 generates image data with, for example, application software and transmits the generated image data to the printing apparatus 100. Further, the PC 101 generates PDL (Page Description Language) data with, for example, application software or a printer driver. Then, the controller 110 generates bitmap data by rasterizing the PDL data transmitted from the PC 101 via the network cable 105. Here, a program or the like for rasterizing is stored in a ROM 112 or a HDD 115 which will be described later.

Here, in the present embodiment, the PC 101 will be described as an example of the external device but this example does not set any limitation. The external device may be a mobile information terminal such as a PDA (personal digital assistant), a smartphone and the like, a network connection device, and an external dedicated device.

Next, a block diagram of the printing apparatus 100 according to the present embodiment will be described with reference to FIG. 1. The printing apparatus 100 includes the controller 110, a printer engine 150 as an image output device, a scanner unit 130 as an image input device, a convey unit 140, and an operation unit 120. They are electrically connected and transmit and receive control commands and data to and from one another.

The controller 110 controls overall operation of the printing apparatus 100 and controls an input and an output of image information or device information. Further, the controller 110 includes a CPU 114, an I/O control unit 111, the ROM 112, a RAM 113, the HDD 115, and an image scaling unit 117 as a plurality of function blocks. Here, the modules are connected via a system bus 116 to one another, respectively.

The CPU 114 is a processor for controlling the entire printing apparatus 100. The CPU 114 integrally controls accesses of various devices which are being connected based on a control program or the like stored in the ROM 112. Further, the CPU 114 integrally controls various processes executed inside the controller 110.

The I/O control unit 111 is a module for controlling communication with an external network.

The image scaling unit 117 changes the scaling rate of the input image data input from the scanner unit 130, PC 101, or the like by converting resolution thereof and generates thumbnail image data in a predetermined image size from the image data. The image size is an attribute that indicates a number of pixels in the main scanning direction and the sub scanning direction (in width and height) of the input image data.

The RAM 113 is a readable and rewritable memory. Further, the RAM 113 is a system work memory where the CPU 114 operates. The RAM 113 stores image data input from the scanner unit 130, PC 101 or the like, thumbnail image data transferred from the image scaling unit 117 via the system bus 116, various programs, setting information and the like.

The ROM 112 is a read-only memory. Further, the ROM 112 is a boot ROM. In the ROM 112, a system boot program is stored in advance.

The HDD 115 mainly stores information to start and operate the computer (system software) and image data.

Here, in a case where the controller 110 includes an NVRAM (not shown), the NVRAM may store the system software, image data, and setting information received via the operation unit 120 to be described later or the like.

The RAM 113 or the HDD 115 stores a sheet management table 400 for managing, as a list, attribute information of sheets used in printing by the printing apparatus 100. The details of the sheet management table 400 will be described later with reference to FIG. 4.

The ROM 112 or the HDD 115 stores various control programs used to execute various processes of a flowchart to be described later which is executed by the CPU 114. Further, the ROM 112 or the HDD 115 stores a display control program used to display various UI screens on a display unit (not shown) of the operation unit 120 that includes a user interface screen (hereinafter, referred to as UI screen). The CPU 114 reads a program stored in the ROM 112 or the HDD 115 and loads the program in the RAM 113 so that the various operations according to the present embodiment are executed.

The printer engine 150 includes an image forming unit 151 and a fixing unit 155. Further, the image forming unit 151 includes a developing unit 152, a photosensitive drum 153, and a transfer belt 154. Here, the details of the image forming unit 151 and the fixing unit 155 will be described later with reference to FIG. 2.

The scanner unit 130 scans an image of a document (sheet) with an optical sensor and obtains the scanned image data. The details of the scanner unit 130 will be described later with reference to FIG. 3.

The convey unit 140 is a unit for conveys sheets from a plurality of sheet holding units (for example, a sheet feeding cassette, a convey plate, a manual tray, or the like). The each sheet holding unit can store more than one kind of sheets and can store more than one sheet. From the sheets stored in the sheet holding unit, an uppermost sheet is separated at a time and carried to the image forming unit 151. Then, the image forming unit 151 prints an image on a sheet conveyed from the sheet holding unit based on the image data input from the scanner unit 130, the PC 101, or the like.

The operation unit 120 corresponds to an example of a user interface unit. The operation unit 120 includes a display unit (not shown) and a key input section (not shown). Further, the operation unit 120 has a function for accepting various settings from a user via the display unit and the key input section. Further, the operation unit 120 has a function for providing information to the user via the display unit.

The display unit includes an LCD (Liquid Crystal Display) and a touch panel sheet attached on the LCD and including a transparent electrode (which may be a capacitance method). The LCD displays an operating screen and a condition of the printing apparatus 100. In the key input section, for example, there are a start key (not shown) used to instruct a start of an execution of scanning, copying or the like, and a stop key (not shown) used to instruct a cancellation of currently executed operation of scanning, copying or the like.

Next, an example of a sectional view illustrating a configuration of the image forming unit 151 will be described with reference to FIG. 2.

The image forming unit 151 forms a toner image on an outer surface of the photosensitive drum 153 with the developing unit 152, based on the image data generated by the controller 110.

Here, the developing unit 152 is placed facing the photosensitive drum 153. The inside of the developing unit 152 is divided, by a partition wall 201 that extends vertically, into a developing unit 202 and an agitating unit 203.

In the developing unit 202, a nonmagnetic developing sleeve 204 that rotates in a direction indicated by the arrow 241 is provided. Inside the developing sleeve 204, a magnet 205 is provided in a fixed manner.

The developing sleeve 204 carries a developing material (For example, it is a two-component developing material. It includes a magnetic carrier and a nonmagnetic toner) which is taken out by a blade 206. Then, the developing material is supplied to the photosensitive drum 153 at a developing area facing to the photosensitive drum 153 to develop the electrostatic-latent image on the photosensitive drum 153. Here, to improve the developing efficiency, that is a toner application rate to the electrostatic-latent image, developing bias voltage having DC voltage overlapped on AC voltage is applied to the developing sleeve 204.

Screws 207 and 208 to agitate the developing material are provided to the developing unit 202 and the agitating unit 203, respectively. The screw 207 agitates the developing material in the developing unit 202 and carries the agitated developing material. On the other hand, the screw 208 agitates toner 213 supplied by rotation of a carrying screw 212 via a toner outlet 211 of a toner supply container 210 and a developing material 214 that already exists in the developing unit 152. Then, the screw 208 carries the agitated developing material and evens up the toner density.

Figure 2:
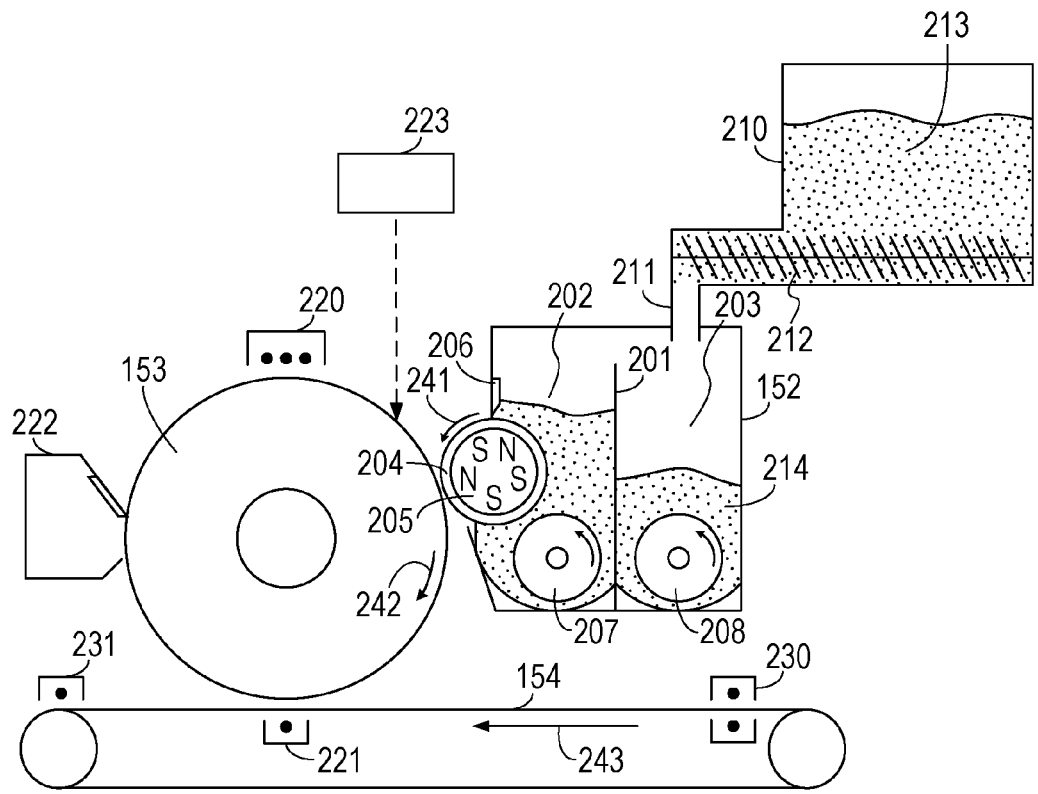
FIG. 2 is an example of a sectional view illustrating a configuration of an image forming unit according to the present embodiment.

Here, developing material paths (not shown) are provided, to the partition wall 201, for communicating the developing unit 202 and the agitating unit 203 to each other, at ends thereof in the front side and the rear side of FIG. 2. The developing material in the developing unit 202, whose toner density is reduced after the consumption of toner during development, is moved to the agitating unit 203 by carrying force of the screws 207 and 208 via one of the developing material paths. Then, the developing material whose toner density is recovered in the agitating unit 203 is moved to the developing unit 202 via the other of the developing material path.

The photosensitive drum 153 is rotary driven in the direction indicated by the arrow 242. Around the photosensitive drum 153, a primary charger 220 that evenly charges the photosensitive drum 153, a developing unit 152, a transfer unit 221 that transfers a developed visible toner image onto a sheet, and a drum cleaner 222 are provided in order in the rotative direction of the photosensitive drum 153.

Further, above the photosensitive drum 153, an image exposure device 223 is provided. The image exposure device 223 includes a semiconductor laser, a polygon mirror, a reflecting mirror, and the like; receives an input of digital pixel signals (video data) corresponding to an image which has been converted into digital signals by the controller 110; and irradiates a laser beam which has been modulated corresponding to the signals.

The image exposure device 223 irradiates the laser beam between the primary charger 220 and the developing unit 152 so that the laser beam travels in the generatrix direction of the photosensitive drum 153. Then, a drum surface of the photosensitive drum 153 is exposed and an electrostatic-latent image is formed. After that, as the photosensitive drum 153 rotates, the electrostatic-latent image is developed as a visible toner image by the developing unit 152.

Under the photosensitive drum 153, the transfer belt 154 that carries a sheet in the direction of the arrow 243 is provided as extending across a plurality of rollers.

The sheet conveyed from the convey unit 140 is carried from the right side of the transfer belt 154. Then, this sheet is held by the transfer belt 154, with an action of attraction chargers 230 which are provided facing to each other across the transfer belt 154, and is carried toward the left side of the transfer belt 154 (the direction of the arrow 243). Then, when the sheet passes between the photosensitive drum 153 and the transfer unit 221, the visible toner image developed on the photosensitive drum 153 is transferred onto the sheet by the action of the transfer unit 221. The sheet on which the toner image has been transferred is separated from the transfer belt 154 by the separation charger 231 and carried to the fixing unit 155.

Then, the sheet passes through between a pressure roller (not shown) and a heat roller (not shown) of the fixing unit 155, and the toner is melted and bonded. With this process, the toner image is fixed on the sheet. Here, toner remained on the photosensitive drum 153 after transferring the toner to the sheet is removed by the drum cleaner 222.

Figure 3:
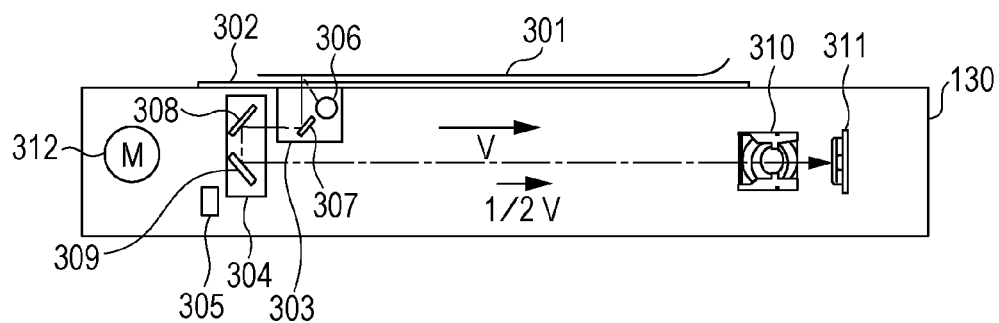
FIG. 3 is an example of a sectional view illustrating a configuration of a scanner unit according to the present embodiment.

Next, an example of a sectional view illustrating a configuration of the scanner unit 130 will be described with reference to FIG. 3.

As the method of reading an image of a document 301, there are two methods, namely, a document feeding-reading method and an optical system moving-reading method. In the document feeding-reading method, the document 301 is loaded on a document loading unit (also referred to as a document tray) (not shown) and an automatic document feeding device (ADF) reads an image of the document 301 at a position of a fixed optical system while carrying the document 301. Here, the ADF is an auto document feeder. On the other hand, in the optical system moving-reading method, the document 301 is loaded on a platen glass (document plate) 302 and the optical system moves and reads the image of the fixed document 301.

Regarding the scanner unit 130 according to the present embodiment, a case where the document 301 is scanned using a document plate will be explained; however, this example does not set any limitation. In the first embodiment, the scanner unit 130 may have both of a configuration to scan the document 301 with an ADF and a configuration to scan the document 301 using a pressing plate.

Here, an instruction to start reading the image (also referred to as scan operation) of the document 301 by the scanner unit 130 is executed, for example, when a user presses a start key (not shown) which is used to instruct to start scanning. Or, the scan operation start instruction may be executed, for example, when the user presses a start button displayed on a display unit (not shown) of the operation unit 120.

The following describes a case where the image of the document 301 is read using the document plate.

In response to the scan operation start instruction, to read the image of the document 301 mounted on a platen glass 302, a first mirror unit 303 and a second mirror unit 304 are moved, by a drive of the motor 312, back to a position where a home position sensor 305 is placed. Then, a document illuminating lamp 306 is turned on and the illumination irradiates the document 301. The reflected light from the document 301 travels to a first mirror 307 in a first mirror unit 303, a second mirror 308 in a second mirror unit 304, and a third mirror 309 in the second mirror unit 304. The reflected light from the third mirror 309 forms an image on a CCD (Charge Coupled Device) sensor 311 via a lens 310, and is input to the CCD sensor 311 as an optical signal.

Here, the second mirror unit 304 moves at a speed (V/2) which is half of the speed (V) of the first mirror unit 303. With this configuration, the document 301 is entirely scanned.

Here, in the present embodiment, the described above is a case where the optical system of the scanner unit 130 is a reduction optical system that forms an image on the CCD sensor 311 based on the reflected light from the document 301; however, this example does not set any limitation. The optical system of the scanner unit 130 may be an equal magnification optical system that forms an image on a CIS (Contact Image Sensor) based on the reflected light from the document 301.

In the present embodiment, as scanning the document 301 by a "optical system moving-reading method with a document plate" is defined as "pressing plate reading" and the following explanation will be given.

Next, the details of the sheet management table 400 for managing attribute information of the sheets used for printing in the printing apparatus 100 will be described with reference to FIG. 4.

Here, as the sheets used for printing in the printing apparatus 100, there are, for example, a sheet used as standard, a sheet evaluated by a printer manufacturer in advance, a user-defined sheet which is the standard sheet or evaluated sheet whose attribute information is customized by a user. The attribute information of the sheets is stored as a list in the sheet management table 400 in RAM 113 or the HDD 115. The data registered in the sheet management table 400 is digital information such as XML (Extensible Markup Language), CSV (Comma-Separated Values), or the like. Then, each software module can read and write the sheet management table 400 stored in the RAM 113 or the HDD 115.

Next, the details of the data (sheet attribute information) registered in the sheet management table 400 will be described.

A sheet name (411) is information to identify the sheet used for printing.

A sub scanning direction sheet length (412), a main scanning direction sheet length (413), a sheet grammage (414), and a sheet surface nature (415) are physical characteristics of the sheets used for printing. Here, the sheet surface nature (415) is an attribute that expresses physical characteristics of a sheet surface, including, for example, "coated" which indicates a surface that is coated to increase the glossiness, "embossed" which indicates a surface with unevenness, or the like.

A sheet color (416) is an attribute that expresses a base color of the sheet. A preprinted sheet (417) is information for identifying whether the sheet used for printing is a preprinted sheet.

The printing apparatus 100 corrects the displacement of the print position of the sheet when executing printing so that the image is printed at a desired print position without any displacement of the print position. A displacement amount (420) of the print position on the front side of the sheet is information that expresses a displacement amount from a desired print position on the front side of the sheet. On the other hand, a displacement amount (421) of the print position on the back side of the sheet is information that expresses a displacement amount from a desired print position of the back side of the sheet.

As the print position displacement amounts (420 and 421), there is, for example, a print position displacement amount in a sub scanning direction with respect to the sheet (hereinafter, also referred to as a read position displacement amount). A read position is a start position of printing an image, based on a starting point that is an edge of the chart at the beginning of the sheet carry direction. Here, an initial value of the read position is zero. When adjusting the read position displacement amount, the irradiation start timing of the laser beam that is irradiated from the image exposure device 223 to the photosensitive drum 153 is adjusted. With this configuration, the starting position of printing an image, based on the starting point which is the edge of the chart at the beginning of the sheet carry direction can be modified.

Further, as the print position displacement amounts (420 and 421), for example, there is a print position displacement amount in the main scanning direction with respect to the sheet (hereinafter, referred to a side position displacement amount). A side position is a starting position of printing an image, based on a starting point which is an edge of the chart at the left side of the sheet carry direction. Here, an initial value of the side position is zero. When adjusting the side position displacement amount, the irradiation start timing of a laser beam that is irradiated from the image exposure device 223 to the photosensitive drum 153 is adjusted. With this configuration, the starting position of printing an image based on the starting point which is the edge of the chart at the beginning of the sheet carry direction can be modified.

Further, as the print position displacement amounts (420 and 421), for example, there are a displacement amount of an image length in the sub scanning direction (a scaling rate with respect to a desired length) and a displacement of an image length in the main scanning direction (a scaling rate with respect to a desired length). Here, initial values of the sub scanning scaling rate and the main scanning scaling rate are zero. The sub scanning scaling rate is adjusted by controlling driving speed of the transfer belt 154. On the other hand, the main scanning scaling rate is adjusted by controlling clock frequency of the laser beam when the image exposure device 223 modulates digital image signals into a laser beam.

The print position displacement amounts (420 and 421) are calculated by scanning, by the scanner unit 130, the adjustment chart on which the predetermined mark is printed and detecting the mark on the adjustment chart. The details of the adjustment chart on which the predetermined mark is printed will be described later with FIGS. 6A and 6B.

As described above, a case where the adjustment of the print position displacement amounts (420 and 421) is executed by, for example, adjusting the laser irradiation timing has been explained; however, this example does not set any limitation. The print position displacement may be adjusted by printing as shifting the image itself to be printed on the sheet at a predetermined amount. Here, when adjusting the print position displacement amount, a user may specify the shift amount of the image to be printed according to need.

An editing screen 500 illustrated in FIG. 5A allows to edit the attribute information of the sheets registered in the sheet management table 400 and newly registers a sheet to the sheet management table 400. Here, the editing screen 500 is displayed on a display unit of the operation unit 120 or a monitor (not shown) of the PC 101, for example.

A sheet selected by the user on the editing screen 500 is highlighted (reversed display). In the example in FIG. 5A, the sheet of "XYZ company colored paper 81" is highlighted. By pressing a button 501 on the editing screen 500, the user can add a new sheet to be registered to the sheet management table 400. Further, by pressing a button 502 on the editing screen 500, the user can edit attribute information of the selected sheet (the highlighted sheet). Here, when the button 501 or the button 502 is pressed, an editing screen 510 illustrated in FIG. 5B is displayed. Here, the editing screen 510 is displayed on a display unit (not shown) of the operation unit 120 or a monitor (not shown) of the PC 101 for example.

On the editing screen 510, the user can input data related to, for example, a sheet name, a sub scanning direction sheet length, a main scanning direction sheet length, a grammage, a surface nature, color, preprinted sheet and the like. Here, the surface nature is selected from a list of surface natures supported by the printing apparatus 100. Further, the color is selected from a list of colors which are registered in advance. After the user input each data, when an end button 511 on the editing screen 510 is pressed, the data (sheet attribute information) that has been input at the timing is set and registered to the sheet management table 400.

On the editing screen 510, the user can input attribute information related to the sheet name, the sub scanning direction sheet length, the main scanning direction sheet length, the grammage, the surface nature, and the color. Here, regarding the surface nature, the user selects one from a list of surface natures supported by the printing apparatus 100. Further, regarding the color, the user can select any color from the list of colors registered in advance. Further, on the editing screen 510, the user can input information whether the sheet being edited is a preprinted sheet or not.

When the user presses the end button 511 on the editing screen 510, the sheet attributes being input at that timing are set and stored in the sheet management table 400.

Then, when the user presses the button 503 on the editing screen 500, a series of processes to adjust the print position for the selected sheet (highlighted sheet) can be executed. Here, the series of processes for adjusting the print position will be described later in detail with reference to the flowcharts illustrated in FIGS. 10, 12, and 17.

Next, an example of a schematic view of the adjustment chart used to adjust the print position will be described with reference to FIGS. 6A and 6B.

An image data of an adjustment chart 601 is stored in the RAM 113 or the HDD 115. When the adjustment chart 601 is printed, the image data of the adjustment chart 601 is read from the RAM 113 or the HDD 115 and transferred to the printer engine 150.

Figure 6A:
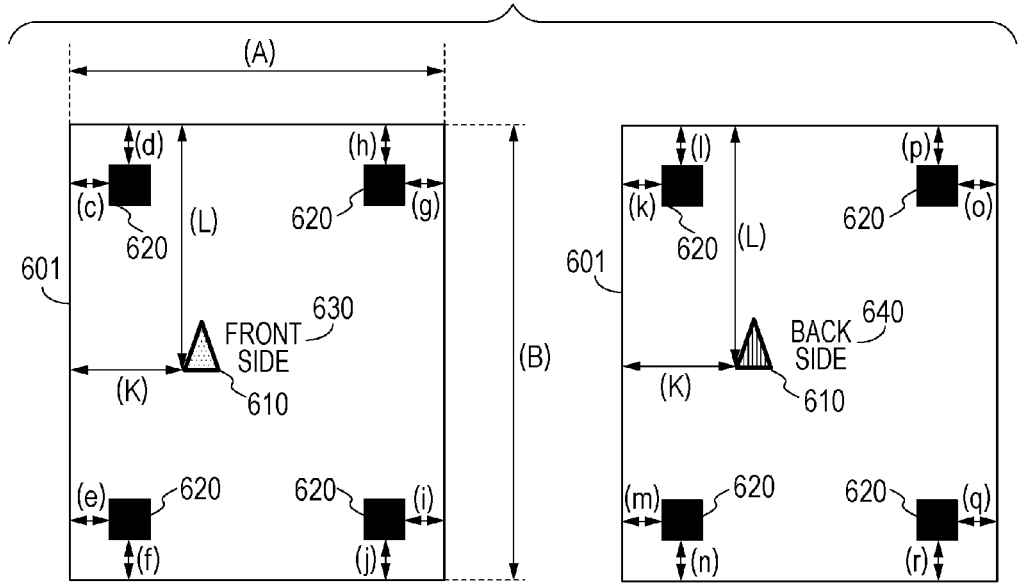
FIGS. 6A and 6B are examples of a schematic view of an adjustment chart according to the present embodiment.

When adjusting the print position of the front side of the sheet, as illustrated in FIG. 6A, a measurement mark 620 as an object is printed at a particular position (for example, at the four corners) on the front side of the sheet. Further, when adjusting the print position of the back side of the sheet, as illustrated in FIG. 6A, the measurement mark 620 as an object is printed at a particular position (for example, at the four corners) on the back side of the sheet. Here, the measurement marks 620 are formed with a toner in a color that has a large difference of reflectance with respect to the standard sheet (for example, a black toner). In this manner, the adjustment chart 601 is printed with four measurement marks 620 on the front side and the back side, respectively, of the chart (eight marks in total).

Further, as illustrated in FIG. 6A, on the front side of the adjustment chart 601, an image 630 used to identify the front side and back side of the chart is printed. Also, as illustrated in FIG. 6A, on the back side of the adjustment chart 601, an image 640 used to identify the front side and back side of the chart is printed. As illustrated in FIG. 6A, the image 630 and the image 640 are letters that help the user to identify the front side and the back side of the chart, for example.

Further, as illustrated in FIG. 6A, at a particular position of the front side of the sheet, a detection mark 610 as an object is printed. Similarly, as illustrated in FIG. 6A, at a particular position of the back side of the sheet, the detection mark 610 as an object is printed.

Here, the detection marks 610 are in a color different from the measurement marks 620. For example, when the color of the measurement marks 620 are black, the color of the detection marks 610 are in a color such as red, blue, or the like.

Here, the color of the detection mark 610 printed on the front side of the adjustment chart 601 and the color of the detection mark 610 printed on the back side of the adjustment chart 601 are made different colors so that the front side and back side of the adjustment chart 601 can be identified.

Here, in the example of FIG. 6A, the detection marks 610 and the measurement marks 620 are in different shapes; however, the detection marks 610 and the measurement marks 620 may be in the same shape.

The detection marks 610 are printed at positions different from the measurement marks 620. The detection marks 610 are placed at positions with a predetermined distance from the edge of the adjustment chart 601 when the detection marks 610 are printed without a displacement of the print position. Further, when printed without a displacement of the print position, the measurement marks 620 are placed at positions with a predetermined distance from the edge of the adjustment chart 601. In other words, when printed without a displacement of the print position, the measurement marks 620 are placed at the positions with a predetermined angle and predetermined distance based on the detection marks 610.

Here, a method for calculating a coordinate of the detection mark 610 and a method for calculating a coordinate of the measurement mark 620 will be explained with reference to FIG. 6B and a computation expression to be described later.

Figure 6B:
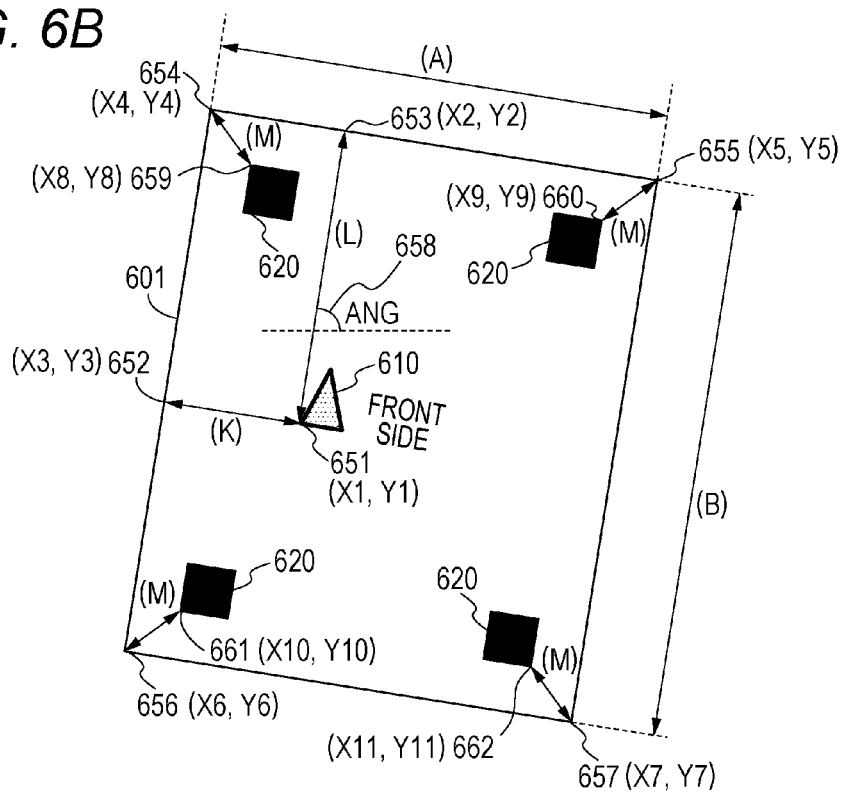

As illustrated in FIG. 6B, a coordinate of a lower left corner (651) of the detection mark 610 is denoted as X1Y1, and an angle (658) that makes the orientation of the adjustment chart 601 horizontal is denoted as ANG.

Further, as illustrated in FIG. 6B, a distance from X1Y1 to an upper side A of the adjustment chart 601 is denoted as L, and a coordinate at an intersection 653 of the upper side A and L is denoted as X2Y2. Further, a distance from X1Y1 to a left side B of the adjustment chart 601 is denoted as K, and a coordinate at an intersection of the left side B and K of the intersection 652 is denoted as X3Y3.

Further, as illustrated in FIG. 6B, a coordinate of the upper left corner (654) of the adjustment chart 601 is denoted as X4Y4, a coordinate of the upper right corner (655) is denoted as X5Y5, a coordinate of the lower left corner (656) is denoted as X6Y6, and the coordinate of the lower right corner (657) is denoted as X7Y7.

Further, as illustrated in FIG. 6B, a coordinate of the upper left corner (659) of the upper left measurement mark 620 is denoted as X8Y8, and a coordinate of the upper right corner (660) of the upper right measurement mark 620 is denoted as X9Y9. Further, a coordinate of the lower left corner (661) of the lower left measurement mark 620 is denoted as X10Y10, and a coordinate of the lower right corner (662) of the lower right measurement mark 620 is denoted as X11Y11.

Further, as illustrated in FIG. 6B, the distance from X4Y4 to X8Y8 is denoted as M, the distance from X5Y5 to X9Y9 is denoted as M, the distance from X6Y6 to X10Y10 is denoted as M, and the distance from X7Y7 to X11Y11 is denoted as M.

With the above definitions, each coordinate can be calculated with the following Equation (1).

[Equation 1]

$$L = \frac{B}{2}$$
$$X2 = X1 + \cos(ANG) \times L$$
$$Y2 = Y1 + \sin(ANG) \times L$$
$$X3 = X1 + \cos\left(ANG + \frac{1}{2}\pi\right) \times K$$
$$Y3 = Y1 + \sin\left(ANG + \frac{1}{2}\pi\right) \times K$$
$$X4 = X2 + X3 - X1$$
$$Y4 = Y2 + Y3 - Y1$$
$$X5 = X4 + \cos\left(ANG - \frac{1}{2}\pi\right) \times A$$
$$Y5 = Y4 + \sin\left(ANG - \frac{1}{2}\pi\right) \times A$$
$$X6 = X4 + \cos(ANG + \pi) \times B$$
$$Y6 = Y4 + \sin(ANG + \pi) \times B$$
$$X7 = X6 + X5 - X4$$
$$Y7 = Y6 + Y5 - Y4$$
$$X8 = X4 + \cos\left(ANG + \frac{5}{4}\pi\right) \times M$$
$$Y8 = Y4 + \sin\left(ANG + \frac{5}{4}\pi\right) \times M$$
$$X9 = X5 + \cos\left(ANG + \frac{3}{4}\pi\right) \times M$$
$$Y9 = Y5 + \sin\left(ANG + \frac{3}{4}\pi\right) \times M$$
$$X10 = X6 + \cos\left(ANG - \frac{1}{4}\pi\right) \times M$$
$$Y10 = Y6 + \sin\left(ANG - \frac{1}{4}\pi\right) \times M$$
$$X11 = X7 + \cos\left(ANG + \frac{1}{4}\pi\right) \times M$$
$$Y11 = Y7 + \sin\left(ANG + \frac{1}{4}\pi\right) \times M$$

As an example, it is assumed a case that a B5-size adjustment chart 601 is placed in a manner of 60 degree inclined on the platen glass 302, and the adjustment chart 601 is scanned with resolution of 600 dpi. With numerical values expressed as pixel values of 600 dpi, the length A of B5 size is 3507 and the length B is 4960. Further, regardless of the size of the adjustment chart 601, it is assumed as the length M is 300, and the length K is 1000. Further, it is assumed the coordinate of the detection mark 610 is X1:3000, Y1:3000.

In this case, the actual calculation result of the coordinate is expressed by the following Equation (2).

[Equation 2]

$$L: \frac{4960}{2} = 2480$$
$$X2: 3000 + \cos\left(\frac{1}{3}\pi\right) \times 2480 = 4240$$
$$Y2: 3000 + \sin\left(\frac{1}{3}\pi\right) \times 2480 = 5148$$
$$X3: 3000 + \cos\left(\frac{1}{3}\pi + \frac{1}{2}\pi\right) \times 1000 = 2134$$
$$Y3: 3000 + \sin\left(\frac{1}{3}\pi + \frac{1}{2}\pi\right) \times 1000 = 3500$$
$$X4: X2 + X3 - X1 = 3374$$
$$Y4: Y2 + Y3 - Y1 = 5648$$
$$X5: X4 + \cos\left(\frac{1}{3}\pi - \frac{1}{2}\pi\right) \times 3507 = 6411$$
$$Y5: Y4 + \sin\left(\frac{1}{3}\pi - \frac{1}{2}\pi\right) \times 3507 = 3895$$
$$X6: X4 + \cos\left(\frac{1}{3}\pi + \pi\right) \times 4960 = 894$$
$$Y6: Y4 + \sin\left(\frac{1}{3}\pi + \pi\right) \times 4960 = 1353$$
$$X7: X6 + X5 - X4 = 3931$$
$$Y7: Y6 + Y5 - Y4 = -400$$

-continued $$X8: X4 + \cos\left(\frac{1}{3}\pi + \frac{5}{4}\pi\right) \times 300 = 3452$$

$$Y8: Y4 + \sin\left(\frac{1}{3}\pi + \frac{5}{4}\pi\right) \times 300 = 5358$$

$$X9: X5 + \cos\left(\frac{1}{3}\pi + \frac{3}{4}\pi\right) \times 300 = 6121$$

$$Y9: Y5 + \sin\left(\frac{1}{3}\pi + \frac{3}{4}\pi\right) \times 300 = 3817$$

$$X10: X6 + \cos\left(\frac{1}{3}\pi - \frac{1}{4}\pi\right) \times 300 = 1184$$

$$Y10: Y6 + \sin\left(\frac{1}{3}\pi - \frac{1}{4}\pi\right) \times 300 = 1431$$

$$X11: X7 + \cos\left(\frac{1}{3}\pi + \frac{1}{4}\pi\right) \times 300 = 3853$$

$$Y11: Y7 + \sin\left(\frac{1}{3}\pi + \frac{1}{4}\pi\right) \times 300 = -110$$

As described above, the measurement marks 620 are printed at the positions with a predetermined distance from the edge of the adjustment chart 601 when the detection marks 620 are printed without any print position displacement.

Then, by measuring the positions of the measurement marks 620 printed on the front side of the adjustment chart 601, a displacement amount of the print position on the front side of the sheet is calculated (or obtained).

Further, by measuring the positions of the measurement marks 620 printed on the back side of the adjustment chart 601, a displacement amount of the print position on the back side of the sheet is calculated (or obtained).

Here, by measuring the relative positions of the respective measurement marks 620 printed on the front side and the back side of the adjustment chart 601, a displacement amount of the print position of the back side with respect to the print position of the front side or a displacement amount of the print position of the front side with respect to the print position of the back side may be calculated (or obtained).

The following will explain a case of adjusting the print position using the adjustment chart 601 with reference to FIGS. 6A, 7, 8A, 8B, 9A and 9B.

To measure the positions of the respective measurement marks 620 on the front side and the back side of the adjustment chart 601, the parts denoted by (A) to (j) are measured on the front side of the adjustment chart 601. In addition, the parts denoted by (k) to (r) are measured on the back side of the adjustment chart 601.

Here, the part (A) is a length of the adjustment chart 601 in the sub scanning direction and the part (B) is a length of the adjustment chart 601 in the main scanning direction. Here, the desired length of the part (A) is the sub scanning direction sheet length (412) registered in the sheet management table 400. Further, the desired length of the part (B) is the main scanning direction sheet length (413) registered in the sheet management table 400. On the other hand, each of the lengths of (c) to (r) is the distance from the measurement mark 620 to a closest edge of the adjustment chart 601.

Here, as a method for measuring (A), (B), (c) to (r), there are a method for measuring manually and a method for calculating automatically. In the method for measuring manually, the user measures the lengths of (A), (B), (c) to (r) by putting a ruler on the adjustment chart 601.

On the other hand, in the method for calculating automatically, the adjustment chart 601 is scanned by the scanner unit 130.

When the adjustment chart 601 is scanned with the pressing plate reading, the user puts a background sheet (not shown) with a black image over the adjustment chart 601 placed on the platen glass 302. This is because the edges of the adjustment chart 601 can be easily detected by scanning with the black image background sheet placed behind the adjustment chart 601.

Figure 8A:
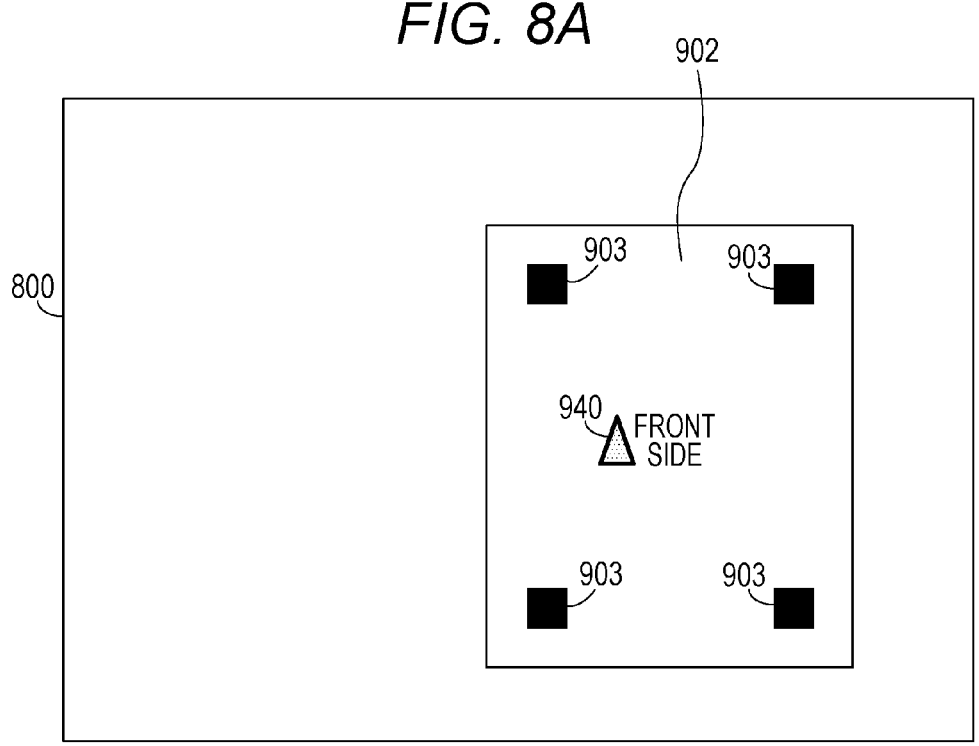
FIGS. 8A and 8B are examples of image data according to a first embodiment.
Figure 8B:
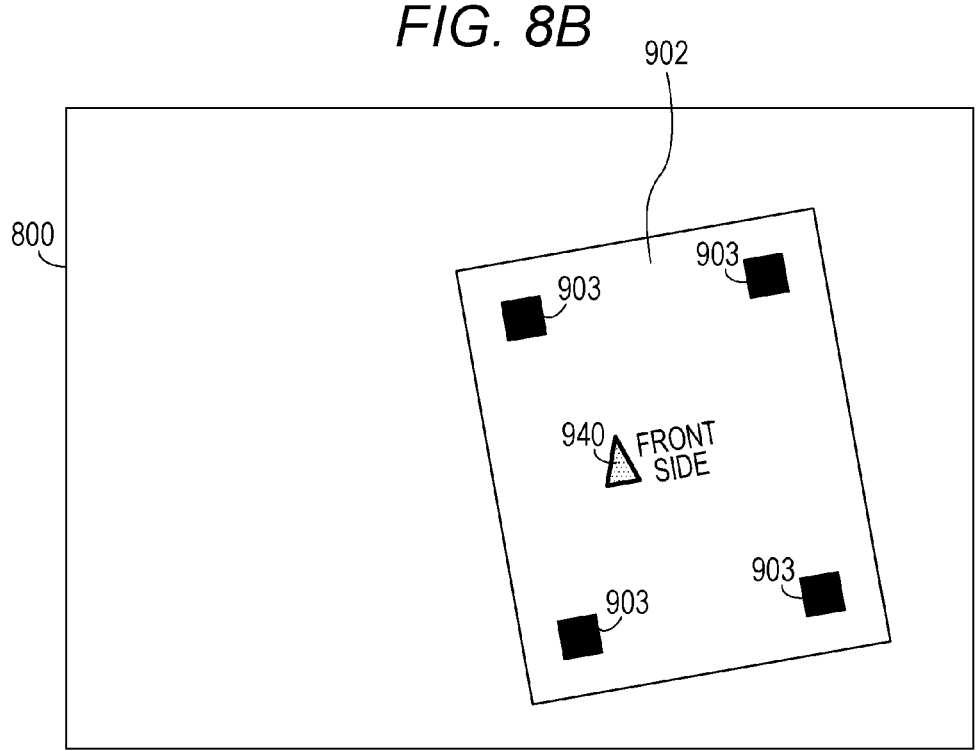

FIGS. 8A and 8B illustrate image data 800 that is generated by scanning the adjustment chart 601 with the black image of the background sheet (not shown) therebehind. FIG. 8A illustrates image data generated when the adjustment chart 601 is scanned while it is placed properly on the platen glass 302. On the other hand, FIG. 8B illustrates image data generated when the adjustment chart 601 is scanned while it is placed on the platen glass 302 in an inclined manner.

The CPU 114 analyzes the image data 800 generated by scanning the image of the adjustment chart 601. As a result of the analysis, the CPU 114 detects, based on the density differences, the edges of the adjustment chart 601, and the edges of the measurement marks 620 (that is, the borders between the base of the adjustment chart 601 and the measurement marks 620). Then, the CPU 114 calculates the lengths of (A), (B), (c) to (r) from the detected edges of the adjustment chart 601 and the edges of the measurement marks 620. The details of the analysis process of the image data 800 of the adjustment chart 601 will be described later with reference to FIGS. 9A and 9B.

Next, a method for calculating a print position displacement amount based on the position of the measurement marks 620 will be described with reference to FIG. 7.

A table 700 illustrated in FIG. 7 defines each one of measured values (710), desired values (711), and print position displacement amounts (712) of "read position," "side position," "main scanning scaling rate," and "sub scanning scaling rate" on the front side and back side of the adjustment chart 601. Here, the table 700 is stored in the RAM 113 or the HDD 115.

For example, the measured value (710) of the "read position" on the front side of the adjustment chart 601 is calculated based on actual measured values of (c) and (e) illustrated in FIG. 6A using the equation in the table 700. In other words, the read position is an average value of the distances from the edge of the chart at the beginning in the sheet carry direction to corresponding measurement marks 620.

Further, for example, the measured value (710) of the "side position" on the front side of the adjustment chart 601 is calculated based on the actual measured values of (f) and (j) illustrated on FIG. 6A using the equation in the table 700. In other words, the side position is an average value of the distances from the edge of the chart on the left side of the sheet carry direction to corresponding measurement marks 620.

Further, for example, the measured value (710) of the "main scanning scaling rate" on the front side of the adjustment chart 601 is calculated from actual measured values of (B), (d), (f), (h), and (j) illustrated in FIG. 6A using the equation in table 700. In other words, the main scanning scaling rate is an average value of distances between the measurement marks 620 arranged on the same scanning line in the main scanning direction.

Further, for example, the measured value (710) of the "sub scanning scaling rate" on the front side of the adjustment chart 601 from actual measured values of (A), (c), (e), (g), and (i) illustrated in FIG. 6A using the equation in the table 700. In other words, the sub scanning scaling rate is an average value of the distances between the measurement marks 620 arranged on the same scanning line in the sub scanning direction.

As illustrated in the table 700, the desired value (711) of the "read position" and "side position" is 1 cm, respectively. In other words, the measurement mark 620 is desirably to be printed at a position which is 1 cm apart from the corresponding edge of the chart.

Further, as illustrated in the table 700, the desired value (711) of the "main scanning scaling rate" is a value obtained by subtracting 2 cm from the main scanning direction sheet length of the respective sheet registered in the sheet management table 400. In other words, the desired value (711) of the "sub scanning scaling rate" is a value obtained by subtracting 2 cm from the sub scanning direction sheet length of the respective sheet registered in the sheet management table 400.

Further, as illustrated in the table 700, the respective print position displacement amounts (712) of the "read position," "side position," "main scanning scaling rate," and "sub scanning scaling rate" are calculated based on the corresponding measured values (710) and desired values (711).

More specifically, the print position displacement amounts (712) of the "read position" and "side position" are calculated by subtracting the desired value (711) from the measured value (710) (The unit is "mm."). On the other hand, the print position displacement amounts (712) of the "main scanning scaling rate" and "sub scanning scaling rate" are calculated by subtracting the desired value (711) from the measured value (710), followed by dividing the subtraction result with the desired value (711) (The unit is "%.").

The print position displacement amounts (712) calculated as described above are registered to the sheet management table 400 as sheet attribute information.

Next, a method for detecting the edges of the adjustment chart 601 and the edges of the measurement mark 620 based on the image data 800 will be described with reference to FIGS. 9A and 9B.

Firstly, a part of the image data 800 generated by scanning the adjustment chart 601 with the pressing plate reading will be described with reference to FIG. 9A.

An area 901 is an image data area based on the background sheet (not shown) in the image data 800. An area 902 (also referred to as an adjustment chart 902) is an image data area based on the base of the adjustment chart 601 in the image data 800. Areas 903 (also referred to as measurement marks 903) are image data areas based on the measurement marks 620 of the adjustment chart 601 in the image data 800. Edges 910 are an edge of the area 902 (that is, an edge of the adjustment chart 601). An edge 912 is an edge of the area 903 (that is, an edge of the measurement mark 620).

Analysis regions 911 are regions to be analyzed in the image data 800 (that is, focused regions of the analysis process). The analysis of the image data 800 is executed by measuring the change in density from the edge of the image data 800 in the main scanning direction and the sub scanning direction in units of pixels. Here, the analysis of the image data 800 may be executed by measuring the change in density from the edge of the image data 800 in the main scanning direction and the sub scanning direction in units of windows and, further, calculating an average value in units of pixels.

Then, the CPU 114 detects the area 901, area 902, area 903, edge 910, and edge 912 based on the measured results. Here, the unit used to measure may be a smaller unit or larger unit than the units of pixels. Further, the interval of reading may be a certain interval or may be skipped once in a while.

Next, an example of the analysis result of the image data 800 in the analysis regions 911 will be described with reference to FIG. 9B. The density measurement of the image data 800 in the analysis regions 911 is executed from the edge of the image data 800.

Figure 9A:
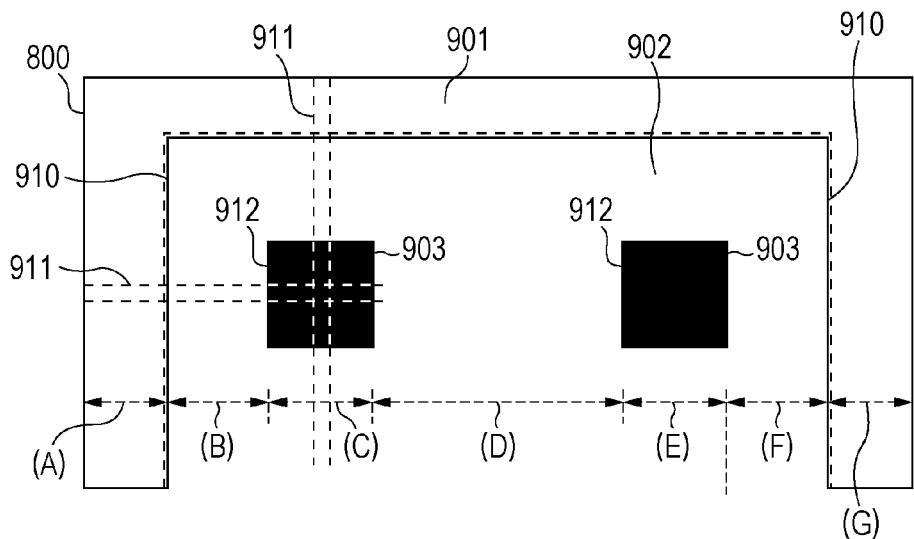
FIGS. 9A and 9B are diagrams for explaining a detection process according to the first embodiment.
Figure 9B:
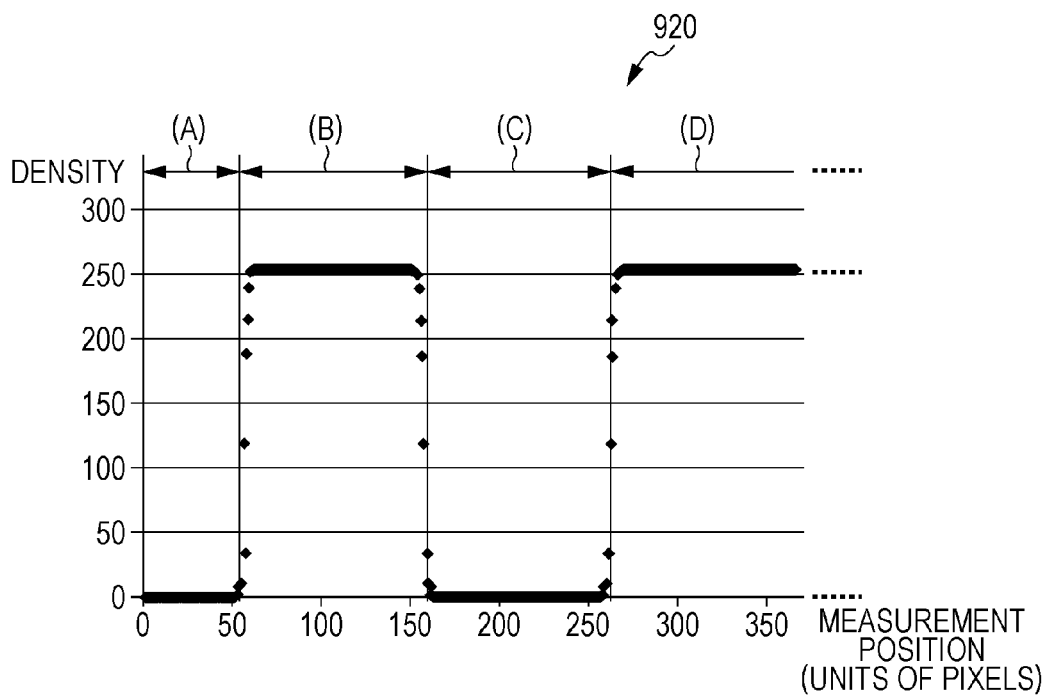

Firstly, the CPU 114 detects the density in of the area 901 (corresponding to the zone (A) in FIG. 9A). Next, the CPU 114 detects the density of the area 902 between the area 901 and the area 903 (corresponding to the zone (B) in FIG. 9A). Next, the CPU 114 detects the density of the area 903 between the area 902 and the area 902 (corresponding to the zone (C) in FIG. 9A). Next, the CPU 114 detects the density of the area 902 between the area 903 and the area 903 (corresponding to the zone (D) in FIG. 9A). Next, the CPU 114 detects the density of the area 903 between the area 902 and the area 902 (corresponding to the zone (E) in FIG. 9A). Next, the CPU 114 detects the density of the area 902 between the area 903 and the area 901 (corresponding to the zone (F) in FIG. 9A). Next, the CPU 114 detects the density of the area 901 (corresponding to the zone (G) in FIG. 9A).

Based on these measured results, the CPU 114 calculates a region of the image printed on the adjustment chart 601 based on the measured positions of the zones (A) to (G) of the image data 800. Further, the CPU 114 detects that the areas 903 in the zone (C) and the zone (E) are caused by the density of the measurement marks 620 printed on the adjustment chart 601. Further, the CPU 114 detects that the areas 901 in the zone (A) and the zone (G) are caused by the density of the base of the background sheet (not shown).

Further, based on the result of the detection, the CPU 114 detects the point where the density switches between the zone (A) and the zone (B) as the edge 910 (that is, the edge (left edge) of the adjustment chart 601). Further, the CPU 114 detects the point where the density switches between the zone (B) and the zone (C) as the edge 912 (that is, the edge (left edge) of the measurement mark 620). Further, the CPU 114 detects the point where the density switches between the zone (C) and the zone (D) as the edge 912 (that is, the edge (right edge) of the measurement mark 620). Further, the CPU 114 detects the point where the density switches between the zone (D) and the zone (E) as the edge 912 (that is, the edge (left edge) of the measurement mark 620). Further, the CPU 114 detects the point where the density switches between the zone (E) and the zone (F) as the edge 912 (that is, the edge (right edge) of the measurement mark 620). Further, the CPU 114 detects the point where the density switches between the zone (F) and the zone (G) as the edge 910 (that is, the edge (right edge) of the adjustment chart 601).

Then, based on the result of the detection, the CPU 114 calculates the distance from the edge (left edge) of the adjustment chart 601 to the edge (left edge) of the left measurement mark 620 as the length (c) of the adjustment chart 601.

Further, the CPU 114 calculates the distance from the edge (right edge) of the right measurement mark 620 to the edge (right edge) of the adjustment chart 601 as the length (g) of the adjustment chart 601.

Further, the CPU 114 calculates the distance from the edge (left edge) of the adjustment chart 601 and the edge (right edge) of the adjustment chart 601 as the length (A) of the adjustment chart 601.

Here, the above describes the calculation method of the lengths (c) and (g) of the adjustment chart 601; however, the lengths (e) and (i), (d) and (f), and (h) and (j) of the adjustment chart 601 can be calculated with the same method. Further, the above describes the calculation method of the length (A) of the adjustment chart 601; however, the length (B) of the adjustment chart 601 can be calculated with the same method.

As described above, since the edges of the adjustment chart 601 and the edges of the measurement mark 620 are detected, the CPU 114 can automatically calculate the lengths (A) to (r) of the adjustment chart 601.

The positions of the four measurement marks 903 in the image data 800 have to be properly detected to obtain the displacement amount of the read position, the displacement amount of the side position, the main scanning scaling rate, and the sub scanning scaling rate as the print position displacement amount.

For this purpose, in the first embodiment, the CPU 114 instructs to read the image of the sheet (adjustment chart 601) including a first object (for example, measurement mark 620) for measuring a displacement of the print position. Then, based on the reading of the image of the adjustment chart 601, the CPU 114 generates image data 800 and thumbnail image data 1800 which has resolution lower than that of the image data 800. Then, the CPU 114 detects a position of a second object (for example, a detection mark 1840) based on generated thumbnail image data 1800. Then, the CPU 114 detects a position of the first object (for example, measurement mark 903) from the image data 800 based on the position of the detected second object. With this, to detect a position of an object used to measure a displacement of the print position, the time of the search process is shortened since it does not have to search all the pixels of the image data 800 that indicates the image of the adjustment chart 601. Hereinafter, the details thereof will be described.

A series of the processes that the printing apparatus 100 according to the first embodiment executes an adjustment of the print position will be described with reference to the flowchart illustrated in FIG. 10. These processes are executed by the CPU 114 of the controller 110 by executing a control program read from the ROM 112 or the HDD 115 and loaded in the RAM 113. Here, the processes in FIG. 10 start in a condition, for example, that the editing screen 500 illustrated in FIG. 5A is being displayed on the display unit (not shown) of the operation unit 120.

In S1001, the CPU 114 accepts a selection of the sheet to adjust the print position by the user via the editing screen 500, and the process proceeds to S1002. Here, when the user presses the button 503 regarding the sheet displayed by highlight display (reversed display) on the editing screen 500, the highlighted sheet (reversed display) is selected as a sheet to adjust the print position.

Figure 11:
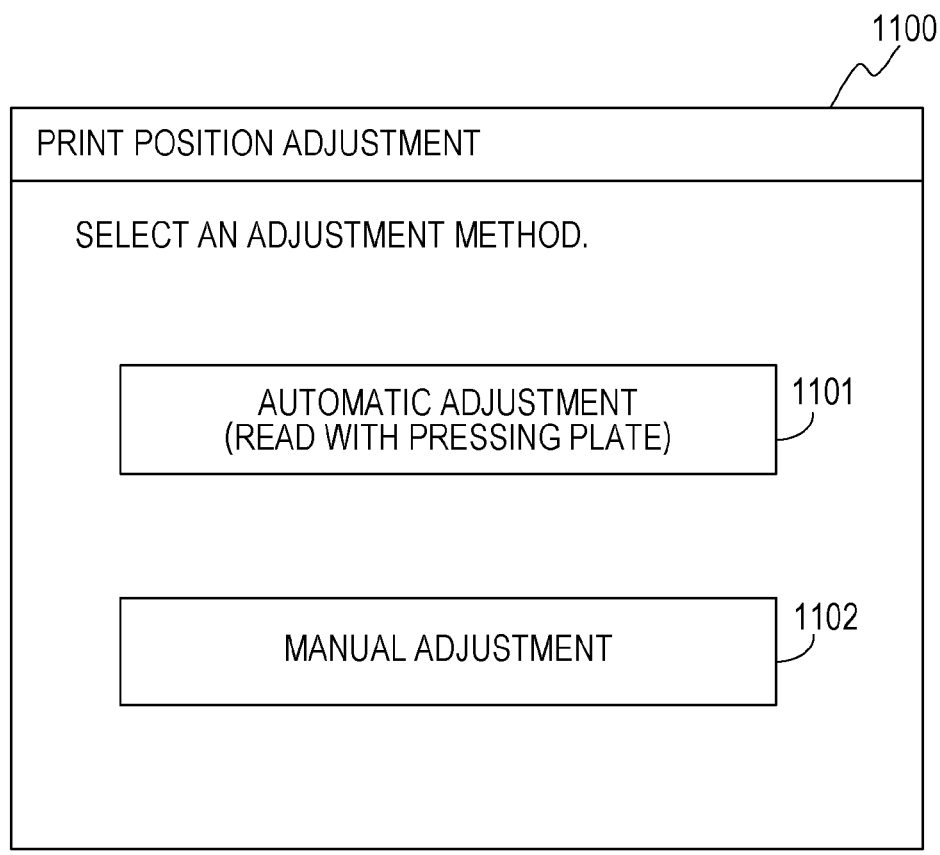
FIG. 11 is a diagram for explaining a configuration of a screen according to the first embodiment.

In S1002, the CPU 114 displays the selection screen 1100 illustrated in FIG. 11 on the display unit (not shown) of the operation unit 120 and the process proceeds to S1003. Here, the selection screen 1100 is a screen to allow the user to choose one of an execution of the automatic adjustment of the adjustment chart 601 with the pressing plate reading (1101) and with the manual adjustment (1102) as a method for adjusting the print position.

In S1003, the CPU 114 determines whether or not the method for adjusting the print position has been selected by the user via the selection screen 1100. Here, when one of the buttons 1101 and 1102 on the selection screen 1100 is pressed, the CPU 114 determines that it means "YES" and the process proceeds to S1004. On the other hand, when determining that it means "NO," the CPU 114 repeats the process in S1003 until one of the buttons 1101 and 1102 on the selection screen 1100 is pressed.

In S1004, the CPU 114 determines whether or not the user has selected the manual adjustment as the method for adjusting the print position. Here, when the button 1102 on the selection screen 1100 is pressed, the CPU 114 determines that it means "YES" and the process proceeds to S1005. On the other hand, when the button 1101 on the selection screen 1100 is pressed, the CPU 114 determines that it means "NO" and the process proceeds to S1200.

In S1200, the CPU 114 executes the series of processes for automatic adjustment of the print position and the process proceeds to S1008. The details of the processes in S1200 will be described later with reference to FIG. 12.

In S1005, the CPU 114 instructs the image forming unit 151 to print the adjustment chart 601 on the sheet selected in S1001. The image forming unit 151 that receives the print instruction prints the adjustment chart 601 on the selected sheet fed from the convey unit 140. Here, the sheet on which the adjustment chart 601 is printed is discharged outside the printing apparatus 100. After the process in S1005, the process proceeds to S1006.

In S1006, the CPU 114 accepts an input of the lengths (A) to (r) (actual measured values) that are manually measured from the user via the editing screen 510 illustrated in FIG. 5B and the process proceeds to S1007.

In S1007, the CPU 114 calculates print position displacement amounts (712) based on the lengths (A) to (r) input in S1006 and the process proceeds to S1008. Here, the print position displacement amounts (712) are calculated with the equations described in FIG. 7.

In S1008, the CPU 114 registers the print position displacement amounts (712) of the sheet selected in the editing screen 500 to the sheet management table 400. For example, in S1008, the read position, the side position, the main scanning scaling rate, the sub scanning scaling rate, and the like are registered as information that express the print position displacement amounts (420) of the front side and the print position displacement amounts (421) of the back side of the sheet selected in S1001. Then, after the process in S1008, the series of the processes according to FIG. 10 is ended.

The above is the details of the series of processes (FIG. 10) for executing the print position adjustment.

Next, a series of the processes for automatic adjustment of the print position will be described with reference to the flowchart illustrated in FIG. 12. These processes are executed by that the CPU 114 of the controller 110 by executing a control program read from the ROM 112 or the HDD 115 and loaded in the RAM 113.

Figure 13:
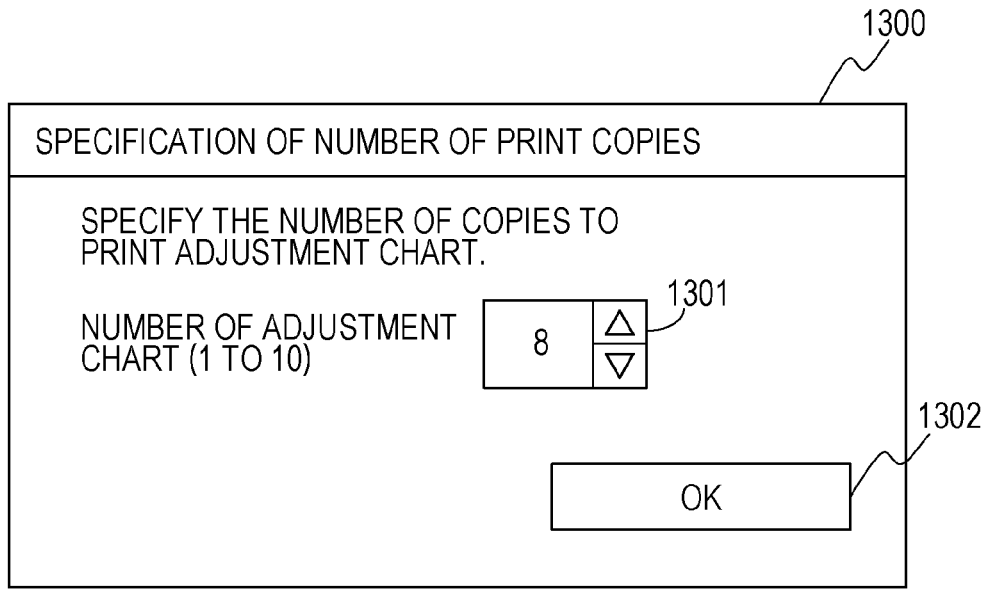
FIG. 13 is a diagram for explaining a configuration of a screen according to the first embodiment.

In S1201, the CPU 114 displays a specification screen 1300 illustrated in FIG. 13 on the display unit (not shown) of the operation unit 120, and the process proceeds to S1202. Here, the specification screen 1300 is a screen for receiving a specification of the number of adjustment charts 601 to be printed to adjust the print position by the user. Here, the accuracy of the print position displacement amount can be improved by scanning a plurality of the adjustment charts 601 (for example, ten sheets) and calculating the average value of the print position displacement amounts. Thus, the user specifies, on the specification screen 1300, the number of adjustment charts 601 to be printed to adjust the print position.

In S1202, the CPU 114 receives the number of the adjustment chart 601 to be printed from the user via the specification screen 1300 and the process proceeds to S1203.

In S1203, the CPU 114 instructs the image forming unit 151 to print the number of copies of the adjustment charts 601 as specified in S1202. In this case, the image data of the adjustment chart 601 is read from the RAM 113 or the HDD 115 and transferred to the printer engine 150. Then, the image forming unit 151 that receives the print instruction prints the adjustment chart 601 on the sheets (that are the sheets selected in the above described S1001) fed from the convey unit 140. Here, the sheets on which the adjustment chart 601 is printed are discharged outside the printing apparatus 100. After the process in S1203, the process proceeds to S1204.

Figure 14:
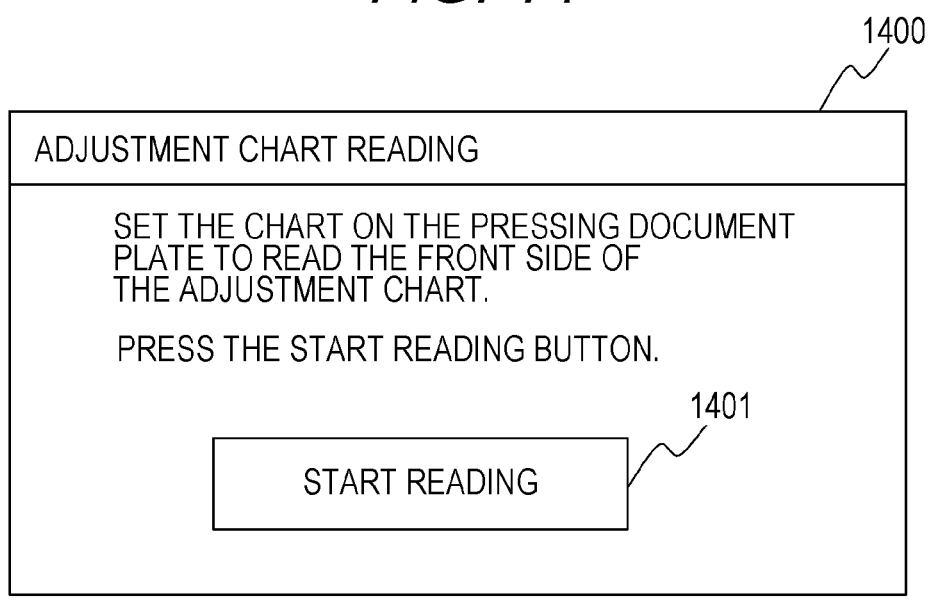
FIG. 14 is a diagram for explaining a configuration of a screen according to the first embodiment.

In S1204, the CPU 114 displays a confirmation screen 1400 illustrated in FIG. 14 on the display unit (not shown) of the operation unit 120. Here, the confirmation screen 1400 is a screen to prompt the user to set the adjustment chart 601 on the platen glass 302 (document plate) so that the image on the front side of the adjustment chart 601 is read. When the user presses the button 1401 (start reading button) of the confirmation screen 1400, the CPU 114 causes the process to proceed to S1205.

In S1205, the CPU 114 instructs the scanner unit 130 to scan the adjustment chart 601 printed in S1203 by the pressing plate reading and the process proceeds to S1206.

IN S1206, the CPU 114 generates image data 800 by scanning the adjustment chart 601 and the process proceeds to S1700.

In S1700, the CPU 114 executes a series of process to detect a position of the measurement mark 903 based on the image data 800 and the process proceeds to S1207. The details of the processes in S1700 will be described later with reference to FIG. 17.

In S1207, the CPU 114 detects the edges 910 of the adjustment chart 902 and the edges 912 of the measurement marks 903 based on the image data 800. Here, the process in S1207 is executed, for example, by the method described above with reference to FIGS. 9A and 9B (for example, a method of measuring changes of density in the main scanning direction and the sub scanning direction from the edge of the image data 800 in units of pixels). After the process of S1207, the process proceeds to S1208.

In S1208, the CPU 114 determines whether or not the detection of the edges 910 of the adjustment chart 902 and the edges 912 of the measurement marks 903 has been successful. When it is determined that the detection has been successful (that is, YES), the CPU 114 causes the process to proceed to S1209. On the other hand, when determined as NO, the CPU 114 causes the process to proceed to S1218. Here, the case that it is determined as NO in S1208 is, for example, a case that the edges of the measurement marks 620 cannot be detected properly since the density difference is small between the base of the sheet on which the adjustment chart 601 is printed and the measurement mark 620.

In S1209, the CPU 114 determines whether or not the back side of the adjustment chart 601 has been scanned in the scan process in S1205. Here, the CPU 114 can determine which of the front side and the back side of the adjustment chart 601 is scanned by analyzing the image data based on the images (630 and 640) used to identify the front side and the back side of the adjustment chart 601. When determining that the back side has been scanned (that is, YES), the CPU 114 the process proceeds to S1212. On the other hand, when determining as NO, the CPU 114 causes the process to proceed to S1210.

In S1210, the CPU 114 calculates the lengths (A) to (j) illustrated in FIG. 6A based on the edges 910 of the adjustment chart 902 and the edges 912 of the measurement marks 903 detected in S1207, and the process proceeds to S1211.

In S1211, a confirmation screen 1500 illustrated in FIG. 15 is displayed on the display unit (not shown) of the operation unit 120. Here, the confirmation screen 1500 is a screen to prompt the user to set the adjustment chart 601 on the platen glass 302 (document plate) so that the image on the back side of the adjustment chart 601 is read. When the user presses a button 1501 (start reading button) of the confirmation screen 1500, the CPU 114 returns to S1205 and the subsequent processes proceeds.

In S1212, the CPU 114 calculates the lengths (k) to (r) illustrated in FIG. 6A based on the edges 910 of the adjustment chart 902 and the edges 912 of the measurement marks 903 detected in S1207 and the process proceeds to S1213.

In S1213, the CPU 114 calculates print position displacement amounts (712) based on the lengths (A) to (j) calculated in S1210 and the lengths (k) to (r) calculated in S1212 and the process proceeds to S1214. Here, the print position displacement amounts (712) are calculated using the equations which have been described with reference to FIG. 7.

In S1214, the CPU 114 determines whether or not the print position displacement amounts with respect to the number of the printed adjustment charts 601 (that is, the number specified in S1202) have been calculated. Here, the CPU 114 maintains the number of executed processes in S1213 as a counter in the HDD 115 or the RAM 113, and executes a determining process in S1214 by comparing the maintained counter value with the number specified in S1202. When determined as YES as a result of the determination in S1214, the CPU 114 causes the process to proceed to S1217. On the other hand, when determined as NO, the CPU 114 causes the process to proceed to S1216.

In S1216, the confirmation screen 1400 illustrated in FIG. 14 is displayed on the display unit (not shown) of the operation unit 120. When the user presses the button 1401 (start reading button) of the confirmation screen 1400, the CPU 114 returns to S1205 and the subsequent processes proceed.

In S1217, the CPU 114 calculates an average value of the print position displacement amounts with respect to the number of printed adjustment chart 601 based on the print position displacement amount calculated in S1213. Then, the CPU 114 determines the average value calculated in S1217 as the print position displacement amount with respect to the sheet selected in S1001 of FIG. 10. Then, after the process of S1217, the series of the processes according to FIG. 12 is ended and the process proceeds to S1008 in FIG. 10.

In S1218, the CPU 114 displays an error screen 1600 illustrated in FIG. 16 on the display unit (not shown) of the operation unit 120. Here, the error screen 1600 is a screen to inform the user that the execution of the print position adjustment is not executed since the analysis of the image data of the adjustment chart 601 has been failed. Then, after the process in S1218, the series of the processes (S1200) according to FIG. 12 is ended and the series of the processes according to FIG. 10 is ended.

The above is the detail description of the series of processes (S1200: FIG. 12) for automatically adjusting the print position by scanning the adjustment chart 601 by the pressing plate reading.

Next, the series of processes for detecting the positions of the measurement marks 903 based on the image data 800 will be described with reference to the flowchart in FIG. 17.

This process is performed by the CPU 114 of the controller 110 by executing a control program read by the ROM 112 or the HDD 115 and loaded in the RAM 113.

Figure 12:
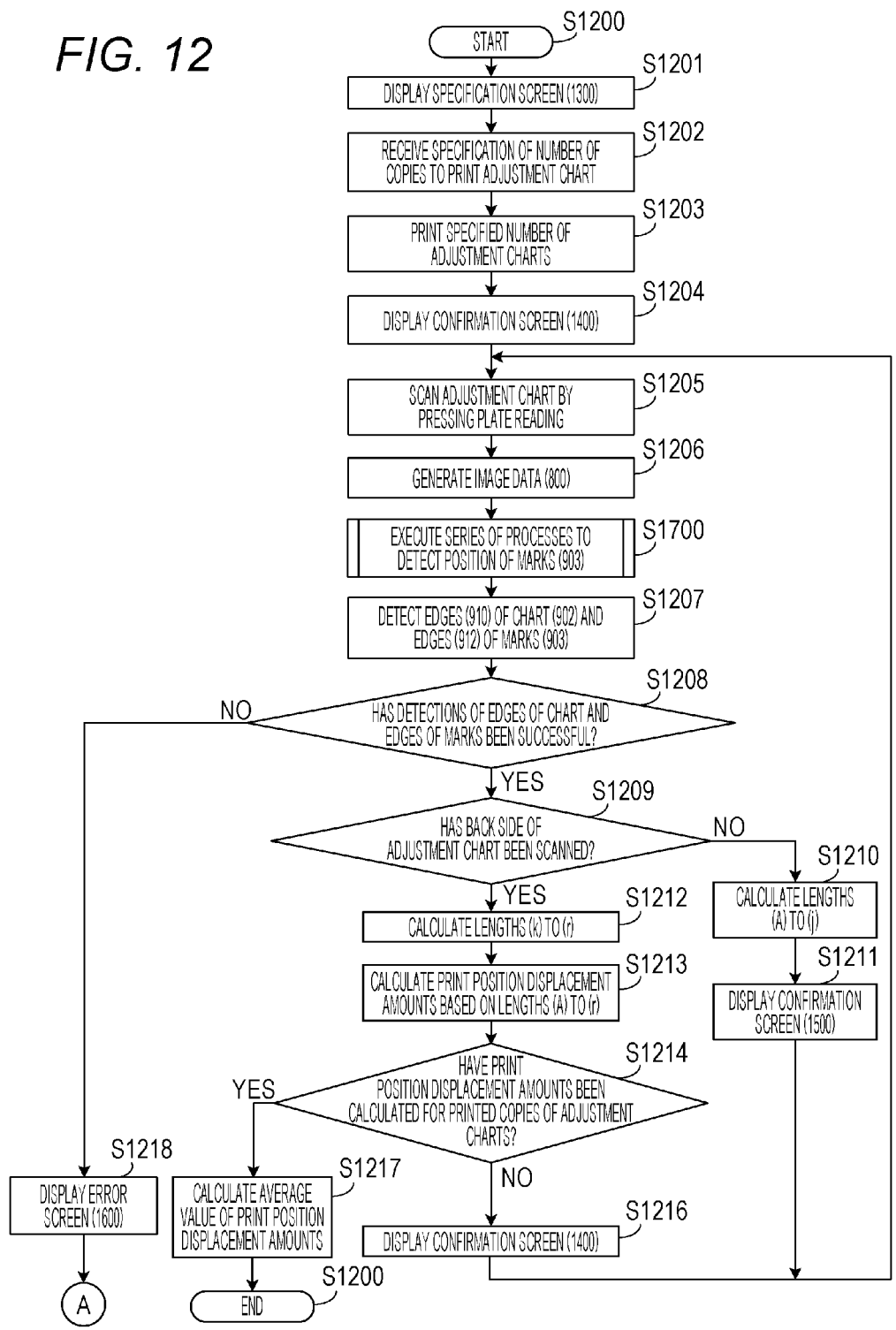
FIG. 12 is a flowchart for explaining an example of control according to the first embodiment.
Figure 18:
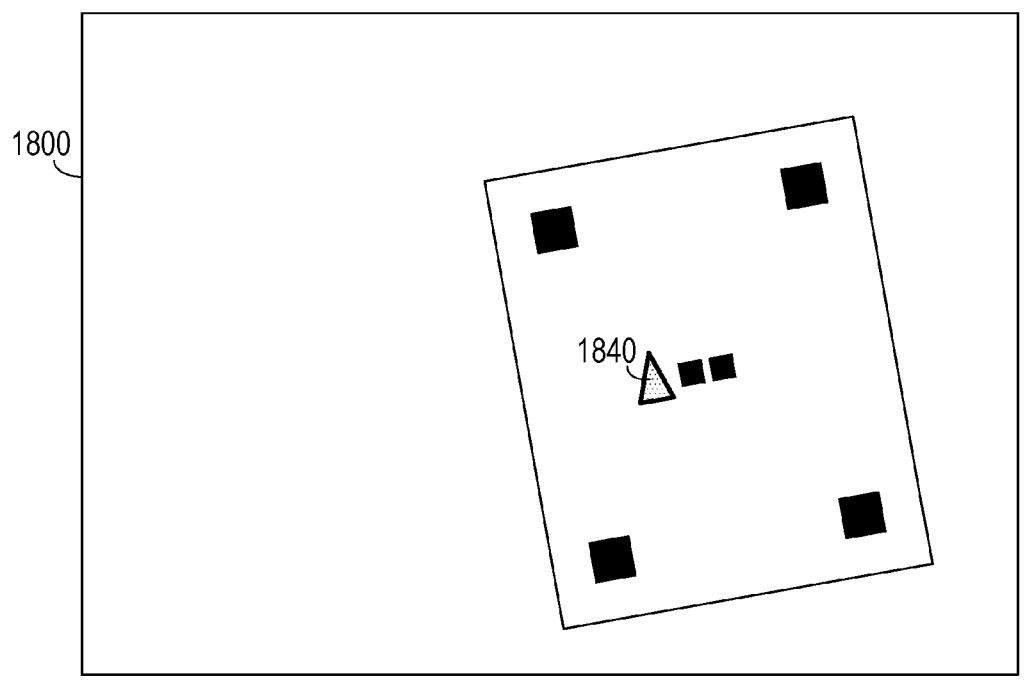
FIG. 18 is an example of thumbnail image data according to the first embodiment.

In S1701, the CPU 114 generates the thumbnail image data 1800 illustrated in FIG. 18 by converting the resolution by the image scaling unit 117 based on the image data 800 generated in the above described S1206 in FIG. 12 and the process proceeds to S1702. The resolution of the image shown by the thumbnail image data 1800 is lower than the resolution of the image shown by the image data 800 generated in S1206. For example, the resolution of the image shown by the thumbnail image data 1800 can be made a half or a quarter of the resolution of the image shown by the image data 800 generated in S1206.

In S1702, the CPU 114 searches color pixels in the thumbnail image data 1800 generated in S1701 and the process proceeds to S1703.

Here, the color pixels in the thumbnail image data 1800 are searched to detect the position of the detection mark 1840 in the thumbnail image data 1800. Here, as described above, the color of the detection mark 610 is red, blue or the like while the background sheet (not shown) and the measurement marks 620 are black. Thus, the CPU 114 can search focusing on the color pixels to detect the position of the detection mark 1840.

Here, searching the color pixels in the thumbnail image data 1800 requires less time for searching compared to the case of searching color pixels in the image data 800. This is because the image size of the thumbnail image data 1800 is smaller than the image data 800, the image data area to be searched can be narrowed.

In S1703, as a result of the searching in S1702, the CPU 114 determines whether or not color pixels have been detected in the thumbnail image data 1800. When determined that the color pixels have been detected (that is, YES), the CPU 114 stops the search process in S1702 and the process proceeds to S1704. On the other hand, when determined that they have not been detected (that is, NO), the CPU 114 repeats the process of S1702 until the color pixels are detected in the thumbnail image data 1800.

In S1704, the CPU 114 detects detection mark 1840 that exists at the position of the color pixels detected in S1703 and the process proceeds to S1705.

In S1705, the CPU 114 calculates the coordinate X1Y1 of the lower left corner (651) of the detection mark 940 in the image data 800 based on the position of the detection mark 1840 detected in S1704, and the process proceeds to S1706.

In S1706, the CPU 114 calculates the orientation of the detection mark 940 (that is, the adjustment chart 902) based on edges 1901 to 1904 of the detection mark 940 in the image data 800, and the process proceeds to S1707. Here, as illustrated in FIG. 19, the edges 1901 to 1904 of the detection mark 940 are placed at the borders between the base of the adjustment chart 902 and the detection mark 940.

In S1707, the CPU 114 obtains the size of the adjustment chart 601 and the process proceeds to S1708. Here, in S1707, the CPU 114 may obtain the size (the sub scanning direction sheet length and the main scanning direction sheet length) of the sheet that the selection is received in the above described S1001 in FIG. 10 from the sheet management table 400.

Figure 20:
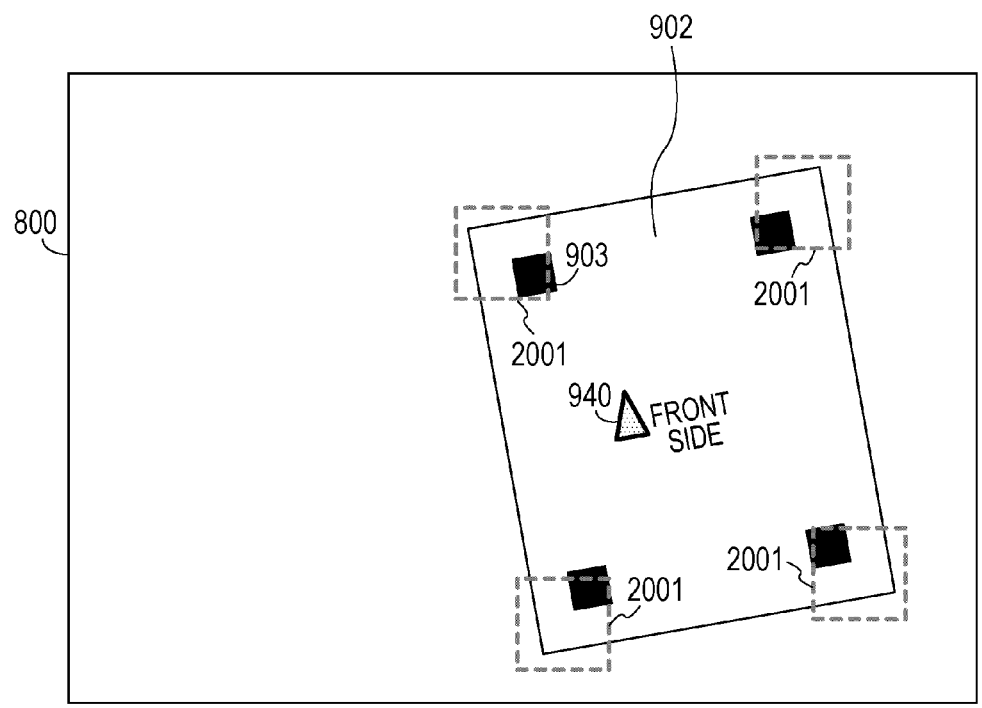
FIG. 20 is a diagram for explaining a detection process according to the first embodiment.

In S1708, the CPU 114 specifies image data areas to calculate the position of the measurement mark 903 from the image data 800 based on the calculated coordinate of the detection mark 940, the calculated orientation of the detection mark 940, and the size of the adjustment chart 601. Here, by the process in S1708, four image data areas 2001 illustrated in FIG. 20 are specified. After the process in S1708, the process proceeds to S1709.

In S1709, the CPU 114 analyzes the changes of density from the edge of the image data area 2001 in the main scanning direction and the sub scanning direction for the image data areas 2001 specified in S1708. Here, the process in S1709 is, for example, executed by the method described with reference to FIGS. 9A and 9B. The analysis of the changes of density in the main scanning direction and the sub scanning direction may be executed either in units of pixels or in units of windows.

After the process in S1709, the series of the processes (S1700) according to FIG. 17 is ended and the process proceeds to S1207 in FIG. 12.

The above is the details of the series of the processes (S1700: FIG. 17) for detecting the position of the measurement marks 903 based on the image data 800.

Figure 10:
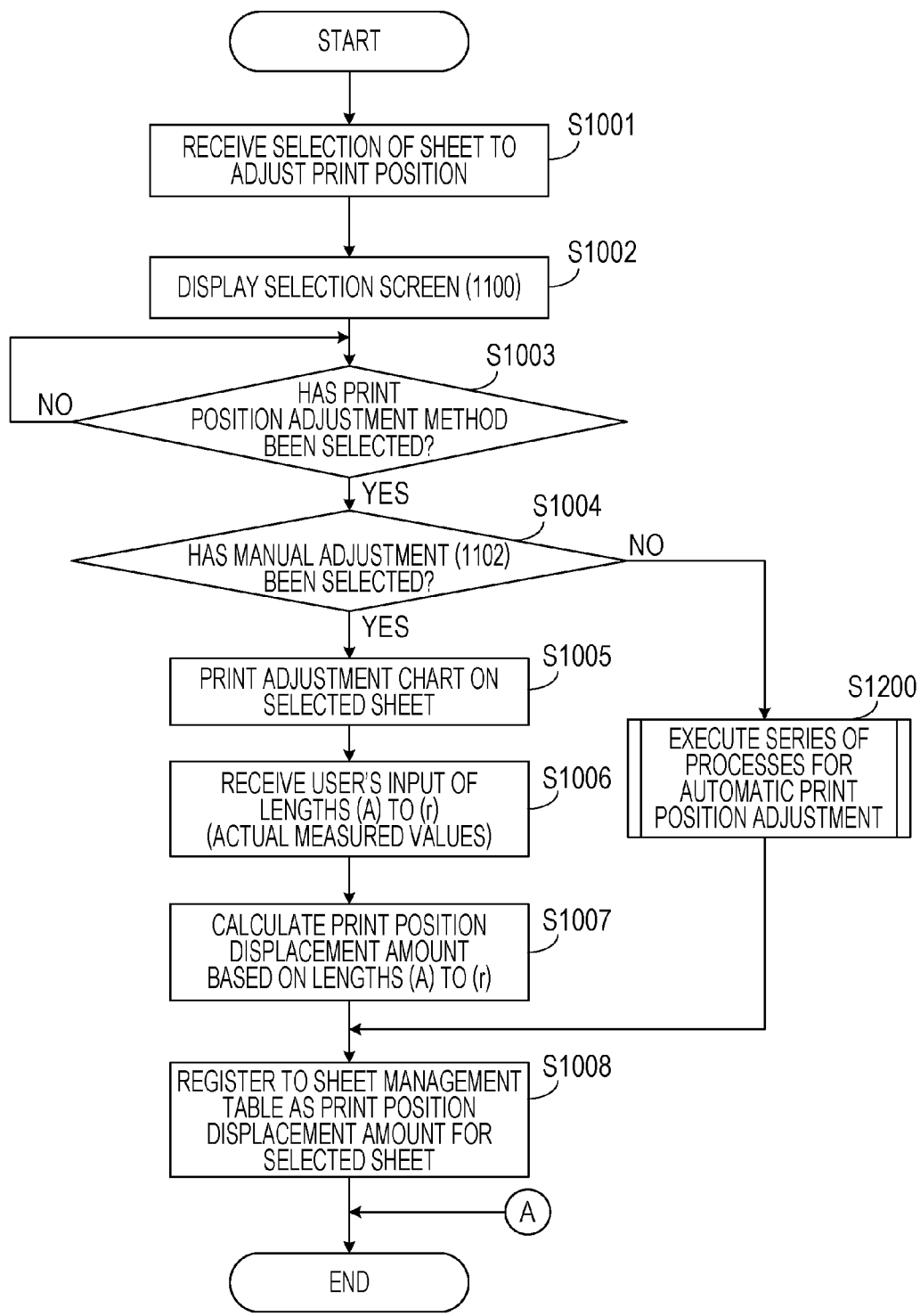
FIG. 10 is a flowchart for explaining an example of control according to the first embodiment.

Then, based on the read position, side position, main scanning scaling rate, and sub scanning scaling rate which are registered in the sheet management table 400 in the above described S1008 in FIG. 10, the printer engine 150 corrects the displacement of the print position and prints the image on the sheet. With this configuration, the image is printed on the sheet after the displacement of the print position is corrected and this gives a great appearance of the printed product.

As described above, according to the first embodiment, in order to measure the displacement of the print position, the CPU 114 searches color pixels in the thumbnail image data 1800 and detects the position of the detection mark 940 in the thumbnail image data 1800. Next, the CPU 114 specifies image data areas to calculate the positions of the plurality of measurement marks 903 from the image data 800 based on the position of the detection mark 940 in the thumbnail image data 1800. With this configuration, the CPU 114 can properly detect the position of the measurement mark 903 without searching all the pixels of the image data 800. This can shorten the time required to detect the position of the object for measuring a displacement of the print position.

[Second Embodiment]

According to the first embodiment, it has been assumed that a detection mark 610 is printed on the adjustment chart 601. In a second embodiment, it is assumed that a detection mark 610 is not printed on an adjustment chart 601.

In the second embodiment, it is assumed that the color of the measurement marks 620 printed on the adjustment chart 601 and the color of the background sheet (not shown) are different. For example, the following explanation will be given assuming that the measurement marks 620 are black and the background sheet is brown.

Figure 23:
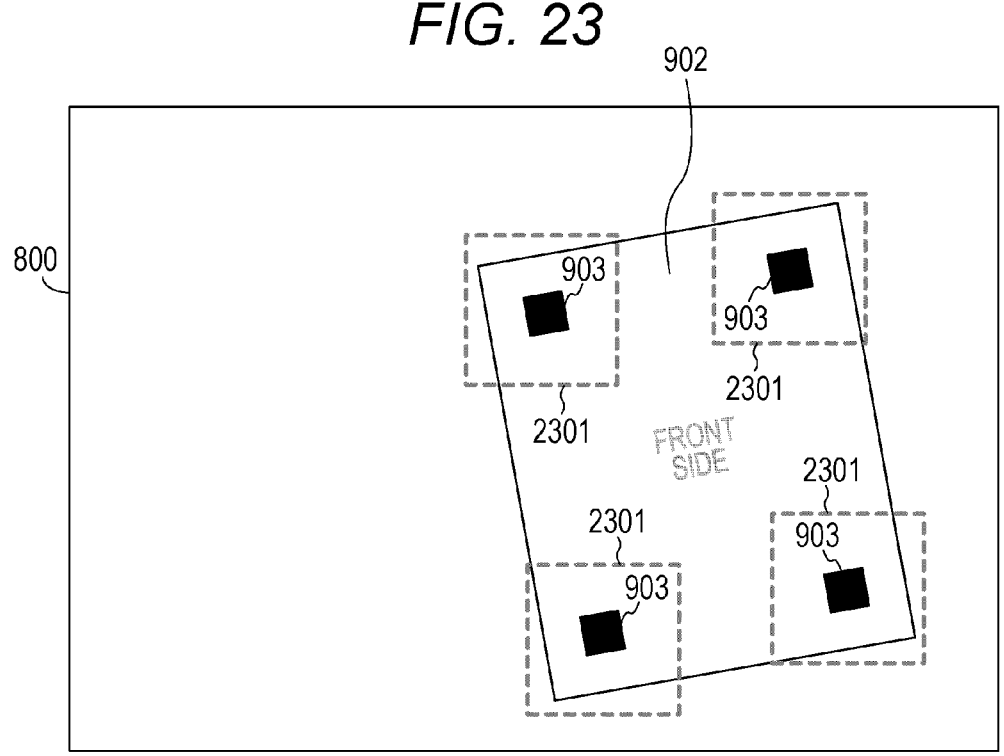
FIG. 23 is an example of image data according to the second embodiment.

In a printing apparatus 100 according to the second embodiment, a part of the series of processes (S1700) for detecting the position of a measurement mark 903 based on image data 800 illustrated in FIG. 23 differs from the first embodiment (the above described example of the control in FIG. 17). Thus, the processes different from those in the first embodiment will be mainly described with reference to FIG. 21.

Figure 22:
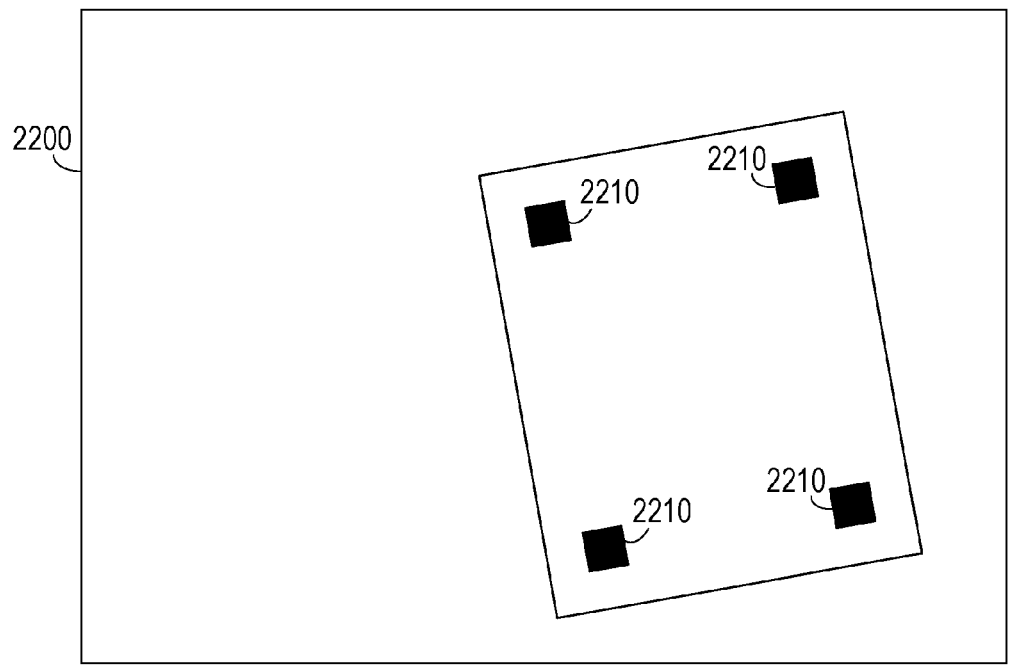
FIG. 22 is an example of thumbnail image data according to the second embodiment.

In S2101, a CPU 114 generates thumbnail image data 2200 illustrated in FIG. 22 by converting the resolution by the image scaling unit 117 based on the image data 800 (FIG. 23) generated in above described S1206 in FIG. 12. After the process in S210, the process proceeds to S2102. The resolution of the image shown by the thumbnail image data 2200 is lower than the resolution of the image shown by the image data 800 (FIG. 23) generated in S1206. For example, the resolution of the image shown by the thumbnail image data

2200 may be made a half or a quarter of the resolution of the image shown by the image data 800 (FIG. 23) generated in S1206.

In S2102, the CPU 114 searches black pixels in the thumbnail image data 2200 generated in S2101 and the process proceeds to S2103.

Here, the black pixels in the thumbnail image data 2200 are searched to detect the four positions of measurement marks 2210 in the thumbnail image data 2200. Here, as described above, the background sheet (not shown) is brown and the measurement marks 2210 are black. Thus, the CPU 114 can search focusing solely on the black pixels to detect the positions of the measurement marks 2210.

Here, searching the black pixels in the thumbnail image data 2200 takes less time compared to searching black pixels in the image data 800 (FIG. 23). This is because the image size of the thumbnail image data 2200 (FIG. 22) is smaller than the image data 800 (FIG. 23), and the image data area to search can be narrowed.

In S2103, as a result of the searching in S2102, the CPU 114 determines whether or not black pixels have been detected in the thumbnail image data 2200. When determined that the black pixels have been detected (that is, YES), the CPU 114 causes the process to proceed to S2104. On the other hand, when determined that they have not been detected (that is, NO), the CPU 114 repeats the process in S2102 until black pixels are detected in the thumbnail image data 2200.

In S2104, the CPU 114 detects the measurement marks 2210 placed at the positions of the black pixels detected in S2103 and the process proceeds to S2105.

In S2105, as a result of detection process in S2104, the CPU 114 determines whether or not the four positions of the measurement marks 2210 have been detected. When determined that the four positions have been detected (that is, YES), the CPU 114 stops the detection process in S2102 and the process proceeds to S2106. On the other hand, when determined that the four positions have not been detected (that is, NO), the CPU 114 repeats the process in S2102 until the four positions of the measurement marks 2210 are detected.

In S2106, the CPU 114 specifies image data areas to calculate the positions of the measurement marks 903 in the image data 800 (FIG. 23) based on the measurement marks 2210 detected in S2104. Here, by the process in S2106, the four image data areas 2301 are specified as illustrated in FIG. 23. After the process in S2106, the process proceeds to S2107.

In S2107, the CPU 114 analyzes the changes in density from the edge of the image data area 2301 in the main scanning direction and the sub scanning direction in the image data areas 2301 specified in S2106. Here, the process in S2107 is, for example, executed by the method above described with reference to FIGS. 9A and 9B. The analysis of the changes in density in the main scanning direction and the sub scanning direction may be executed either in units of pixels and in units of windows.

Figure 21:
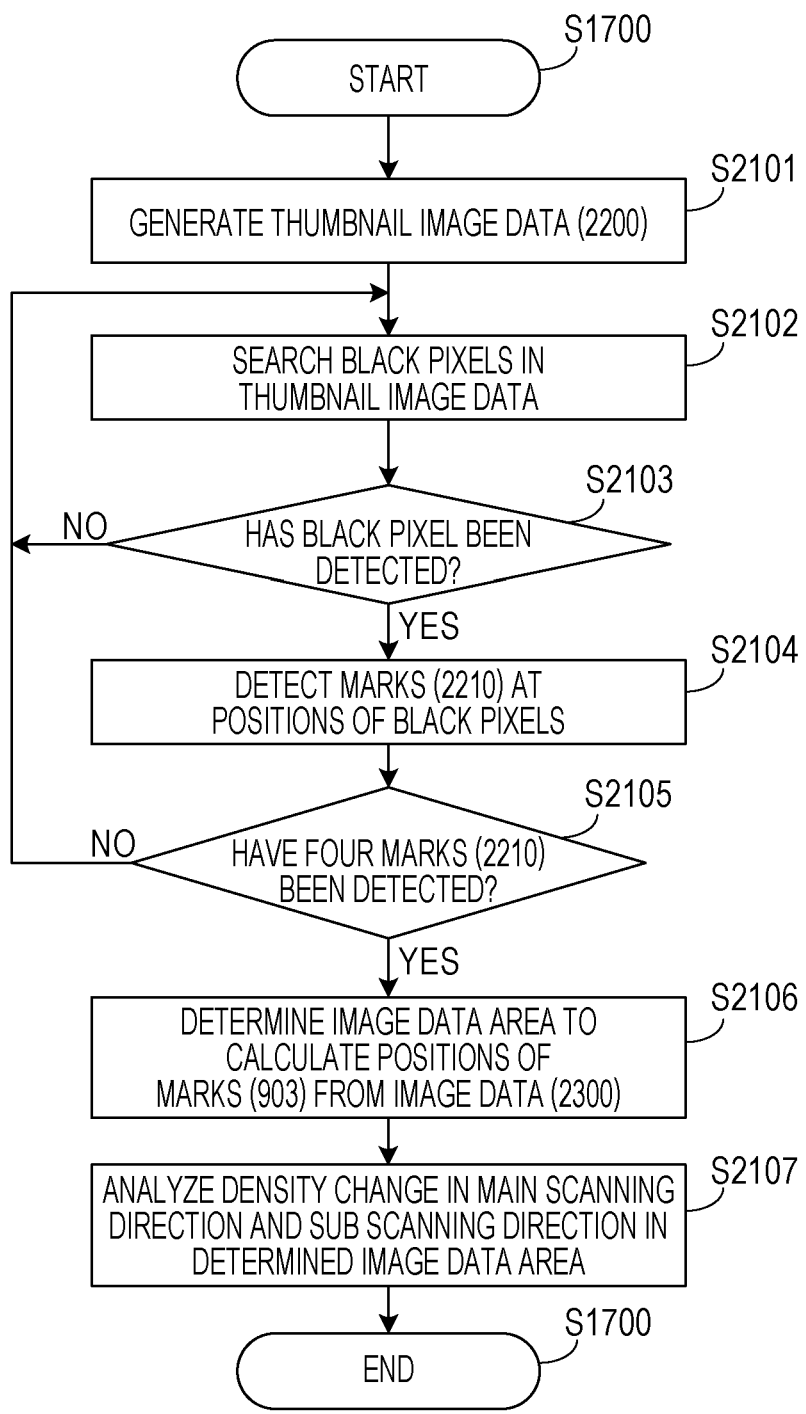
FIG. 21 is a flowchart for explaining an example of control according to a second embodiment.

After the process in S2107, the series of processes (S1700) according to FIG. 21 is ended and the process proceeds to S1207 in FIG. 12.

The above is the details of the series of the processes (S2100: FIG. 21) for detecting the positions of the measurement marks 903 based on the image data 800 (FIG. 23).

Then, based on a read position, side position, main scanning scaling rate, and sub scanning scaling rate registered in a sheet management table 400 in above described S1008 in FIG. 10, a printer engine 150 corrects the displacement of the print position and prints the image on the sheet. With this configuration, the image is printed on the sheet as correcting the displacement of the print position, and this gives a great appearance of the printed product.

As described above, according to the second embodiment, in order to measure the displacement of the print position, the CPU 114 searches the black pixels in the thumbnail image data 2200 and detects the positions of the measurement marks 2210 in the thumbnail image data 2200. Next, based on the positions of the measurement marks 2210 in the thumbnail image data 2200, the CPU 114 specifies the image data areas to calculate the positions of the plurality of measurement marks 903 in the image data 2300. With this configuration, the CPU 114 can properly detect the positions of the measurement marks 903 without searching all the pixels in the image data 2300. This can shorten the time required to detect the position the object for calculating a displacement of the print position.

The present invention is not limited to the above described embodiments and various modifications (including organic combinations of individual embodiments) can be applied based on the scope of the present invention, and those are not eliminated from the scope of the present invention.

For example, in the embodiments herein, the CPU 114 of the controller 110 in the printing apparatus 100 has been described as a main body of the above various control; however, the present invention is not limited to the example. A part of or the all of the above various controls may be executed by the printing apparatus 100 and a print control apparatus such as controller which is separately provided and externally attached.

Further, the embodiment to which the present invention is applied has been explained using the printing apparatus 100 including the printer engine 150; however, this example does not set any limitation. The embodiment to which the present invention is applied can be explained similarly using an image processing apparatus that does not include the printer engine 150.

Further, the embodiment to which the present invention is applied has been described using the printing apparatus 100 including the image forming unit 151 that handles a monochromatic toner; however, this example does not set any limitation. The embodiment to which the present invention is applied can be explained similarly using a color printing apparatus including the image forming unit 151 that handles multi-color toner. For example, in a case of a full-color printing apparatus 100 that handles four colors of cyan (C), magenta (M) yellow (Y), and black (K), the print position adjustment can by performed using the black toner and the print position in other colors can be adjusted based on the print position in black.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-025843, filed Feb. 12, 2015, which is hereby incorporated by reference herein in its entirety.

What is claimed is:

1. A printing apparatus comprising:
a printer configured to print an image including an object and a detection object on a sheet, the object being placed at a different position from the detection object on the sheet;
a scanner configured to read the image of the sheet on which the image including the object and the detection object are printed by the printer; and
a controller, including a processor, configured to execute:
a generating task that generates first image data according to the reading of the image including the object and the detection object by the scanner;
a determining task that determines an area to detect a position of the object from second image data based on the first image data, the first image data having resolution lower than that of the second image data;
a detecting task that detects the detection object from the first image data, and detects the position of the object from the area;
an obtaining task that obtains a print position based on the position of the object; and
a print controlling task that controls the printer, based on the print position obtained by the obtaining task, to print an output image on a sheet,
wherein the determining task determines the area to detect the position of the object from the second image data, based on the position of the detection object detected from the first image data, an orientation of the detection object, and the size of the sheet from which the image is read by the scanner.

2. The printing apparatus according to claim 1, wherein the object and the detection object are in different colors.

3. The printing apparatus according to claim 1, wherein the object and the detection object are in different shapes.

4. The printing apparatus according to claim 1,
wherein the controller is further configured to execute a receiving task that receives an instruction to obtain the print position which are to be input by the user, and
wherein the obtaining task obtains, in a case where the controller receives the instruction, the print position input by the user.

5. The printing apparatus according to claim 1,
wherein the controller is further configured to execute a setting task that sets the print position obtained in the obtaining task after associating a displacement amount with the sheet on which the image including the object is printed by the printer, and
wherein the printing controlling task controls, based on the set print position, the printer to print the output image on the sheet.

6. The printing apparatus according to claim 1,
wherein the controller is further configured to execute a selecting task that selects, based on a user instruction, a sheet, and
wherein the controller controls the printer to print the image including the object on the selected sheet.

7. The printing apparatus according to claim 1, wherein the first image data is thumbnail image data, and
wherein the second image data is image data.

8. The printing apparatus according to claim 1, wherein the scanner reads the image on the sheet on which the image including the object is printed by the printer, without conveying the sheet.

9. A printing apparatus comprising:
a printer configured to print an image on a sheet;
a scanner configured to read a detection image that is printed on the sheet by the printer, and output a first reading image data; and
a controller, including a processor, configured to execute:
a creating task that creates a second reading image data based on the first reading image data, wherein a resolution of the second reading image data is lower than a resolution of the first reading image data;
a determining task that determines a detection area on the first reading image data based on the second reading image data;
a detecting task that detects the detection image based on the direction area on the first reading image data;
a generating task that generates an adjustment value for adjusting a print position on the sheet, based on a result of the detection of the detection area on the first reading image data; and
a printing task that controls the printer based on the adjustment value to print an output image on a sheet.

10. The printing apparatus according to claim 9,
wherein the detection image includes a first detection image and a second detection image, and
wherein the determining task determines a position of the first detection image based on the second reading image data, and determines the detection area on the first reading image data based on the determined position.

11. The printing apparatus according to claim 10, wherein the first detection image and the second detection image are in different colors.

12. The printing apparatus according to claim 10,
wherein the first detection image includes a predetermined image in chromatic color, and
wherein the second detection image includes another predetermined image in black.

13. The printing apparatus according to claim 10, wherein the first detection image and the second detection image are in different shapes.

14. The printing apparatus according to claim 9,
wherein the detecting task detects the detection image based on the detection area on the first reading image data to determine a distance from an edge of the sheet to the second detection image, and
wherein the generation task generates the adjustment value for adjusting the print position on the sheet based on the distance.

15. The printing apparatus according to claim 9, wherein the second reading image data corresponds to thumbnail image.

16. A control method in a printing apparatus, the method comprising:

controlling the printing apparatus to print a detection image on a sheet;

obtaining a first reading image data by reading the detection image on the sheet;

creating a second reading image data based on the first reading image data, wherein a resolution of the second reading image data is lower than a resolution of the first reading image data;

determining a detection area on the first reading image data based on the second reading image data;

detecting the detection image based on the detection area on the first reading image data;

generating an adjustment value for adjusting a print position on the sheet, based on a result of the detection of the detection area on the first reading image data; and controlling the printing apparatus based on the adjustment value to print an output image on a sheet.

17. A non-transitory computer readable storage medium storing instructions that, when executed by a computer of a printing apparatus, control the computer to perform a method comprising:

controlling the printing apparatus to print a detection image on a sheet;

obtaining a first reading image data by reading the detection image on the sheet;

creating a second reading image data based on the first reading image data, wherein a resolution of the second reading image data is lower than a resolution of the first reading image data;

determining a detection area on the first reading image data based on the second reading image data;

detecting the detection image based on the detection area on the first reading image data;

generating an adjustment value for adjusting a print position on the sheet, based on a result of the detection of the detection area on the first reading image data; and controlling the printing apparatus based on the adjustment value to print an output image on a sheet.

* * * * *